(12) United States Patent
Mandai et al.

(10) Patent No.: US 11,112,654 B2
(45) Date of Patent: Sep. 7, 2021

(54) LIQUID CRYSTAL DISPLAY DEVICE

(71) Applicant: NISSAN CHEMICAL INDUSTRIES, LTD., Chiyoda-ku (JP)

(72) Inventors: Atsuhiko Mandai, Funabashi (JP); Naoki Sakumoto, Funabashi (JP)

(73) Assignee: NISSAN CHEMICAL INDUSTRIES, LTD., Chiyoda-ku (JP)

( * ) Notice: Subject to any disclaimer, the term of this patent is extended or adjusted under 35 U.S.C. 154(b) by 192 days.

(21) Appl. No.: 15/764,459

(22) PCT Filed: Sep. 28, 2016

(86) PCT No.: PCT/JP2016/078687
§ 371 (c)(1),
(2) Date: Mar. 29, 2018

(87) PCT Pub. No.: WO2017/057496
PCT Pub. Date: Apr. 6, 2017

(65) Prior Publication Data
US 2018/0284543 A1 Oct. 4, 2018

(30) Foreign Application Priority Data
Sep. 30, 2015 (JP) .............................. JP2015-193907

(51) Int. Cl.
| | | |
|---|---|---|
| *G02F 1/1337* | (2006.01) | |
| *C08G 73/10* | (2006.01) | |
| *C08F 20/30* | (2006.01) | |
| *C09D 179/08* | (2006.01) | |
| *C08F 283/04* | (2006.01) | |
| *C08G 73/12* | (2006.01) | |
| *C09K 19/56* | (2006.01) | |
| *G02F 1/1343* | (2006.01) | |

(52) U.S. Cl.
CPC ........ *G02F 1/133723* (2013.01); *C08F 20/30* (2013.01); *C08F 283/045* (2013.01); *C08G 73/10* (2013.01); *C08G 73/128* (2013.01); *C09D 179/08* (2013.01); *C09K 19/56* (2013.01); *G02F 1/133788* (2013.01); *C09K 2323/00* (2020.08); *C09K 2323/02* (2020.08); *C09K 2323/027* (2020.08); *G02F 1/133726* (2021.01); *G02F 1/133773* (2021.01); *G02F 1/134363* (2013.01); *G02F 1/134372* (2021.01)

(58) Field of Classification Search
CPC ........ G02F 1/133723; G02F 1/133711; G02F 1/337; G02F 1/133788; G02F 1/13378; G02F 1/134363; G02F 1/133726; G02F 1/133733; G02F 2001/133726; G02F 2001/133733; C08F 20/30; C08G 73/10; C08G 73/128; C09K 19/56; C09K 2323/00; C09K 2323/02; C09K 2323/027; Y10T 428/10; Y10T 428/1005; Y10T 428/1023
USPC ......... 428/1.1, 1.2, 1.26; 349/123, 127, 128, 349/132; 528/353
See application file for complete search history.

(56) References Cited

U.S. PATENT DOCUMENTS

| | | | |
|---|---|---|---|
| 2011/0007254 A1* | 1/2011 | Terashita | .......... G02F 1/133711 349/123 |
| 2011/0222005 A1* | 9/2011 | Mizusaki | ............... C08G 73/12 349/123 |

FOREIGN PATENT DOCUMENTS

| | | | | |
|---|---|---|---|---|
| CN | 102879846 A | 1/2013 | | |
| JP | 2-37324 A | 2/1990 | | |
| JP | 3893659 B2 | 3/2007 | | |
| JP | 2013-250476 A | 12/2013 | | |
| WO | WO 2009/157207 A1 | 12/2009 | | |
| WO | WO 2014/054785 A2 | 4/2014 | | |
| WO | WO-2014185412 A1 * | 11/2014 | ........... | C09D 179/08 |
| WO | WO 2015/122413 A1 | 8/2015 | | |
| WO | WO 2015/133469 A1 | 9/2015 | | |

OTHER PUBLICATIONS

Schadt, M., et al., "Surface-Induced Parallel Alignment of Liquid Crystals by Linearly Polymerized Photopolymers", Japanese Journal of Applied Physics, vol. 31 No. 7, 1992, pp. 2155-2164 with cover page.

Ichimura, K., "Photoalignment of Liquid-Crystal Systems", Chemical Reviews, vol. 100 No. 5, 2000, pp. 1847-1873.

* cited by examiner

*Primary Examiner* — Ruiyun Zhang
(74) *Attorney, Agent, or Firm* — Oblon, McClelland, Maier & Neustadt, L.L.P.

(57) ABSTRACT

A liquid crystal display device, which includes a first substrate and a second substrate disposed to face each other with a liquid crystal sandwiched therebetween. The first substrate is an electrode-provided substrate having a first electrode and a plurality of second electrodes overlaid on the first electrode via an insulating film, formed on a pixel region on a surface on the liquid crystal side, where one of the first electrode and the second electrodes is a pixel electrode and the other is a counter electrode, having a first liquid crystal alignment film formed on the surface on the liquid crystal side of the first substrate covered with the second electrodes. The second substrate is a substrate having a second liquid crystal alignment film formed on a surface on the liquid crystal side, the second liquid crystal alignment film containing a photosensitive side chain type polymer which develops liquid crystallinity.

6 Claims, No Drawings

LIQUID CRYSTAL DISPLAY DEVICE

TECHNICAL FIELD

The present invention relates to an in-plane switching mode liquid crystal display device, such as a FFS mode liquid crystal display device, which satisfies both alignment property and reliability.

BACKGROUND ART

In recent years, liquid crystal display devices are remarkably developing as lightweight, thin and low power consumption display devices. A liquid crystal display device is so constituted that a liquid crystal layer is sandwiched between a pair of transparent substrates provided with an electrode. And, in a liquid crystal display device, an organic film composed of an organic material is used as a liquid crystal alignment film so that the liquid crystal is in a desired alignment state between the substrates.

The liquid crystal alignment film is formed on a surface to be in contact with the liquid crystal of the substrate sandwiching the liquid crystal, and has a role to align the liquid crystal in a certain direction between the substrates. The ability to control the alignment of the liquid crystal (hereinafter referred to as the alignment control performance) of the liquid crystal alignment film is imparted by applying an alignment treatment to an organic film constituting the liquid crystal alignment film.

As a method of the alignment treatment to impart the alignment control performance thereby to obtain the liquid crystal alignment film, a rubbing method has been known. The rubbing method is a method of rubbing the surface of the organic film on the substrate with a cloth of e.g. cotton, nylon or polyester to align the liquid crystal in the rubbing direction.

However, the rubbing method has a problem in generation of dust or static electricity. Further, due to tendency toward high definition of the liquid crystal display device in recent years, and irregularities by the electrode on the corresponding substrate and the active switching element to drive the liquid crystal, the surface of the liquid crystal alignment film may not uniformly be rubbed with a cloth, and uniform liquid crystal alignment may not be realized in some cases.

Accordingly, as another method of alignment treatment to obtain the liquid crystal alignment film without conducting rubbing, a photo-alignment method has been studied. There are various ways of the photo-alignment method, and by linearly polarized light or collimated light, anisotropy is formed in the organic film constituting the liquid crystal alignment film, and the liquid crystal is aligned in accordance with the anisotropy. As the photo-alignment method, heretofore, decomposition type photo-alignment method, or photo-crosslinking type or photo-isomerization type photo-alignment method, etc. have been known.

The decomposition type photo-alignment method is a means such that, for example, a polyimide film is irradiated with polarized ultraviolet rays to cause anisotropic decomposition utilizing dependency of the molecular structure on the polarization direction of ultraviolet absorption, and the liquid crystal is aligned by the polyimide remained undecomposed (Patent Document 1).

The photo-crosslinking type or photo-isomerization type photo-alignment method is a means such that, for example, using polyvinyl cinnamate, the film is irradiated with polarized ultraviolet rays to cause a dimerization reaction (crosslinking reaction) at a double bond portion of two side chains in parallel with the polarized light to align the liquid crystal in a direction perpendicular to the polarization direction (Non-Patent Document 1). Further, in the case of using a side chain type polymer having azobenzene in its side chains, the film is irradiated with polarized ultraviolet rays to cause isomerization at the azobenzene portion of side chains in parallel with the polarized light to align the liquid crystal in a direction perpendicular to the polarization direction (Non-Patent Document 2). Further, Patent Document 3 discloses a liquid crystal alignment film obtained by a photo-alignment method by photo-crosslinking, photo-isomerization or photo Fries rearrangement.

As the mode of the liquid crystal display device, the vertical electric field mode such as TN mode or VA mode, or an in-plane switching mode such as IPS mode or field switching (fringe field switching: FFS) mode has been known.

A FFS mode liquid crystal display device employs a display mode such that an electric field is applied to an upper layer electrode and a lower layer electrode laminated on one substrate thereby to apply a fringe electric field to the liquid crystal sandwiched between said one substrate and a facing substrate. That is, in this mode, the liquid crystal is driven by the fringe electric field generated between the slit-like upper layer electrode provided on an upper layer and the lower layer electrode provided on a lower layer via an insulating film (Patent Document 4).

In the FFS mode liquid crystal display device, since the slit-like upper layer electrode and the lower layer electrode are formed by a transparent electrically conductive film, the aperture and the transmittance are improved as compared with the IPS mode. Further, in the FFS mode liquid crystal display device, the auxiliary capacity is formed between such transparent electrically conductive films, the transmittance loss by the auxiliary capacity formed portion can be reduced.

PRIOR ART DOCUMENTS

Patent Documents

Patent Document 1: JP3893659
Patent Document 2: JP-A-2-37324
Patent Document 3: WO2014/054785
Patent Document 4: JP-A-2013-254076

Non-Patent Documents

Non-Patent Document 1: M. Shadt et al., Jpn. J. Appl. Phys. 31, 2155 (1992).
Non-Patent Document 2: K. Ichimura et al., Chem. Rev. 100, 1847 (2000).

DISCLOSURE OF INVENTION

Technical Problem

Of the FFS mode liquid crystal display device, the substrate on which the upper layer electrode and the lower layer electrode are formed in view of its structure, and the other substrate on which no electrode is formed in relation to peripheral members, etc., greatly differ in properties of the alignment film required and the process acceptable in production. Specifically, the substrate on the electrode side is required to have high liquid crystal alignment property and reliability, and the other substrate having no electrode is required to have an alignment film which can be formed at a lower temperature so as to prevent deterioration of the peripheral members at the time of heating and which has favorable liquid crystal alignment property, and a liquid crystal display device having such substrates has higher performance.

The object of the present invention is to overcome the above problems and to provide an in-plane mode liquid crystal display device such as a FFS mode liquid crystal display device having favorable liquid crystal alignment property and electrical properties.

Solution to Problem

The present inventors have conducted extensive studies to achieve the above objects and as a result, accomplished the present invention.

The present invention has the following construction.
1. A liquid crystal display device, which comprises a first substrate and a second substrate disposed to face each other with a liquid crystal sandwiched therebetween, wherein the first substrate and the second substrate have the following characteristics:

first substrate: an electrode-provided substrate having a first electrode and a plurality of second electrodes overlaid on the first electrode via an insulating film formed on a pixel region on a surface on the liquid crystal side, so constituted that one of the first electrode and the second electrodes is a pixel electrode and the other is a counter electrode, having a first liquid crystal alignment film formed on the surface on the liquid crystal side of the first substrate covered with the second electrodes, and the first liquid crystal alignment film being an alignment film containing a polyimide having liquid crystal alignment performance imparted by irradiation with polarized ultraviolet rays;

second substrate: a substrate having a second liquid crystal alignment film formed on a surface on the liquid crystal side, and the second liquid crystal alignment film being an alignment film containing a photosensitive side chain type polymer which exhibits liquid crystallinity dependent on the temperature.

Advantageous Effects of Invention

According to the liquid crystal display device of the present invention, since alignment control performance is imparted with a high efficiency, its display properties will not be impaired even when continuously operated for a long period of time.

DESCRIPTION OF EMBODIMENTS

Now, embodiments of the present invention will be described in detail.
<First Substrate>
The first substrate which the liquid crystal display device of the present invention has, has a first electrode and a plurality of second electrodes overlaid on the first electrode via an insulating film, formed on a pixel region on a surface on the liquid crystal side. And, the first substrate is so constituted that one of the first electrode and the second electrodes is a pixel electrode and the other is a counter electrode, and has a first liquid crystal alignment film (hereinafter sometimes referred to as a first alignment film in this specification) formed on a surface on the liquid crystal side of the first substrate covered with the second electrodes. The structure of the first substrate is known and is disclosed, for example, in JP-A-2013-234076.

<First Alignment Film>
The first substrate has a first alignment film containing a polyimide having liquid crystal alignment performance imparted by irradiation with polarized ultraviolet rays. The first alignment film is obtained from a liquid crystal aligning agent (hereinafter sometimes referred to as a first liquid crystal aligning agent) containing at least one member selected from the group consisting of a polyimide precursor obtained by reaction of a tetracarboxylic acid derivative component and a diamine component, and a polyimide obtained by imidizing it.

The tetracarboxylic acid derivative may be a tetracarboxylic dianhydride represented by the following formula (1) and in addition, a tetracarboxylic acid diester dichloride represented by the following formula (1-a) and a tetracarboxylic acid diester represented by the following formula (1-b). The polyimide precursor may be a polyamic acid or a polyamic acid ester obtainable by subjecting the tetracarboxylic acid derivative and a diamine represented by the following formula (2) to polycondensation:

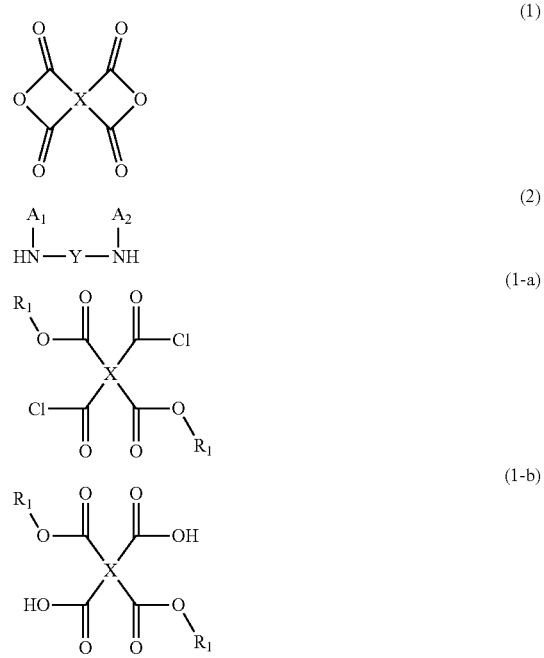

In the formulae (1-a) and (1-b), $R_1$ is a $C_{1-4}$ alkyl group. From the viewpoint of easiness of progress of imidization, it is preferably a methyl group or an ethyl group, more preferably a methyl group.

In the formulae (1), (1-a) and (1-b), X is a tetravalent organic group, and its structure is not particularly limited. As its specific examples, the following formulae (X-1) to (X-44) may be mentioned.

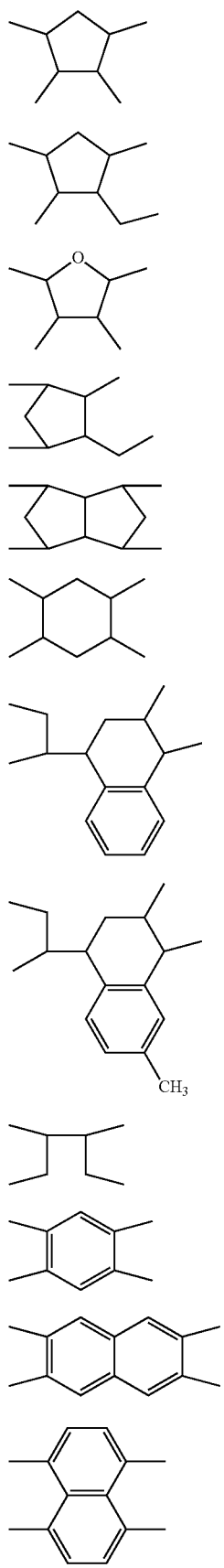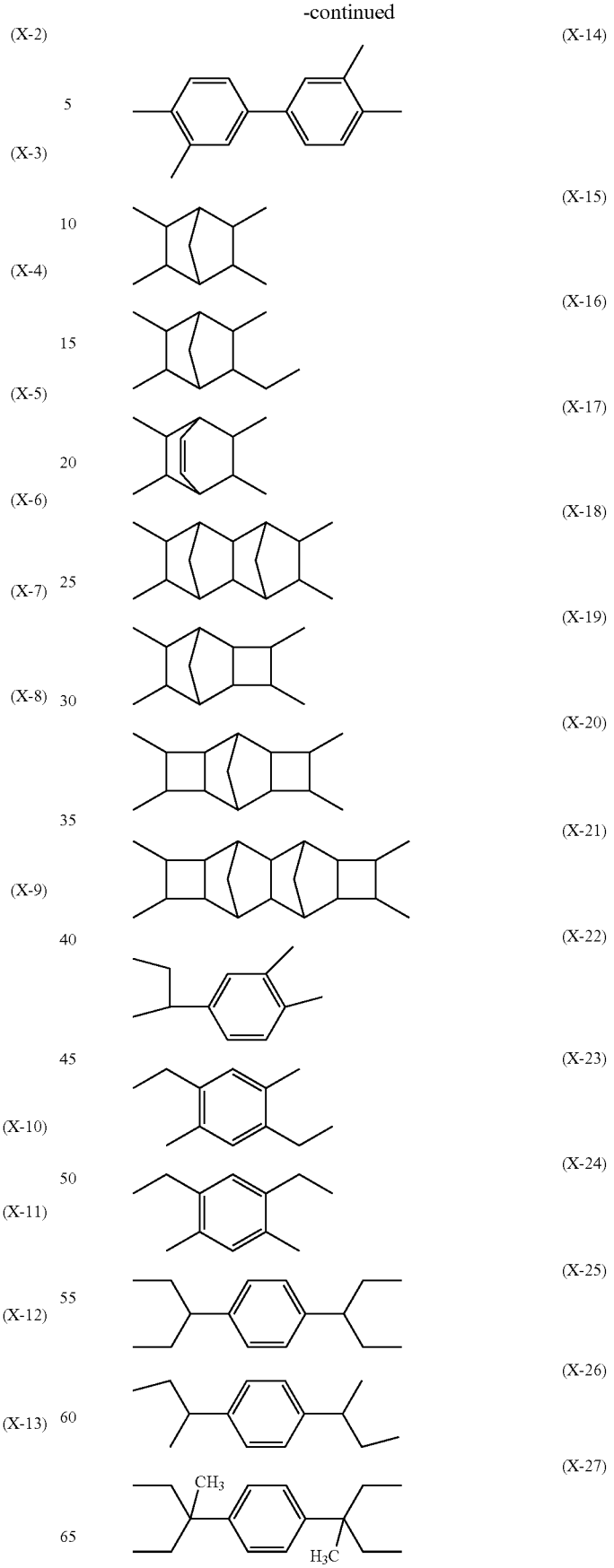

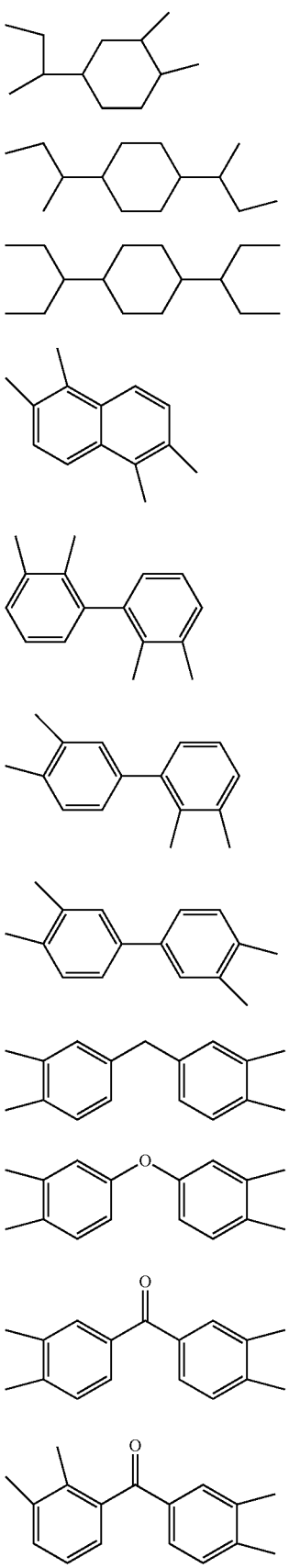

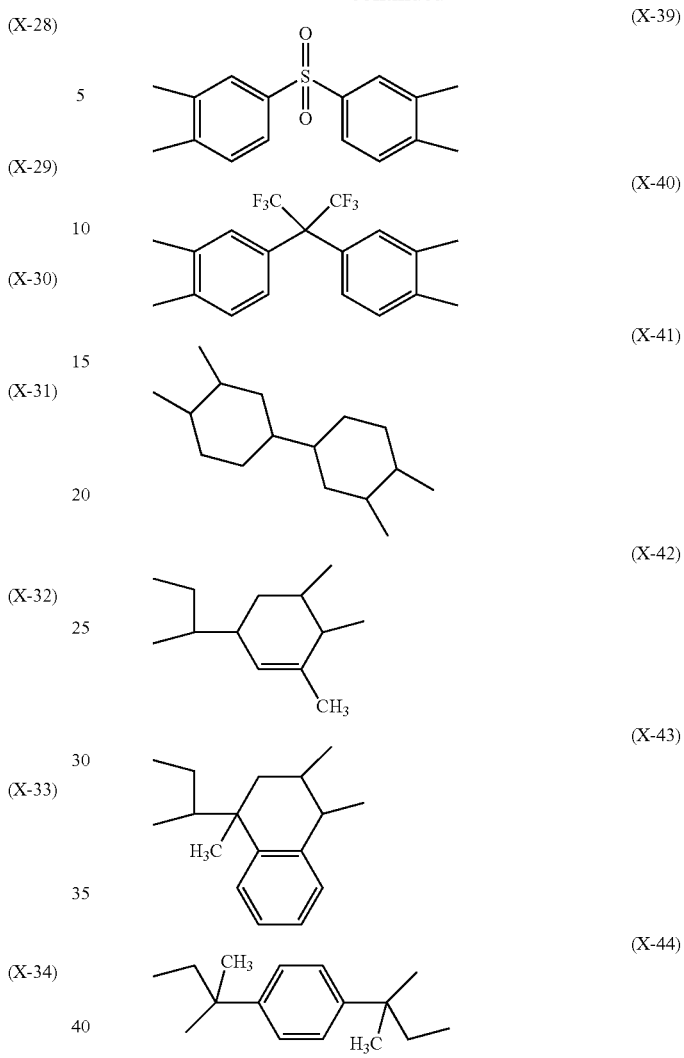

In the above formula (X-1), $R_1$, $R_2$, $R_3$ and $R_4$ are each independently a hydrogen atom, a halogen atom, a $C_{1-6}$ alkyl group, a $C_{2-6}$ alkenyl group, a $C_{2-6}$ alkynyl group or a phenyl group.

The tetracarboxylic dianhydride is, in view of availability, preferably a compound represented by the following formula (3) wherein $X_1$ is at least one member selected from the group consisting of structures of the above formulae (X-1) to (X-14):

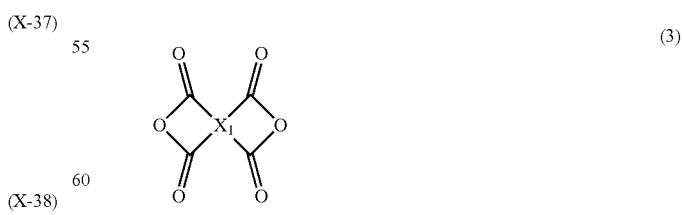

Among them, in order to further improve the reliability of the obtainable liquid crystal alignment film, $X_1$ is preferably (X-1) to (X-7) or (X-10), more preferably (X-1), and in order to obtain more favorable liquid crystal alignment property, preferably the following formula (X1-1) or (X1-2).

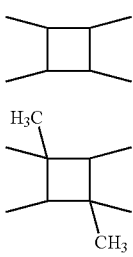
(X1-1)

(X1-2)

In a case where the tetracarboxylic dianhydride represented by the formula (3) is used, its proportion is from 40 to 100 mol %, more preferably from 60 to 100 mol % based on all the tetracarboxylic acid derivative components to be reacted with the diamine component.

In the diamine represented by the above formula (2), $A_1$ and $A_2$ are each independently a hydrogen atom, a $C_{1-10}$ alkyl group, a $C_{2-10}$ alkenyl group or a $C_{1-10}$ alkynyl group.

The alkyl group may, for example, be specifically a methyl group, an ethyl group, a propyl group, a butyl group, a t-butyl group, a hexyl group, an octyl group, a decyl group, a cyclopentyl group or a cyclohexyl group.

The alkenyl group may be a group in which at least one $CH_2$—$CH_2$ structure present in the alkyl group is replaced with a CH=CH structure, and may, for example, be more specifically a vinyl group, an allyl group, a 1-propenyl group, an isopropenyl group, a 2-butenyl group, a 1,3-butadienyl group, a 2-pentenyl group, a 2-hexenyl group, a cyclopropenyl group, a cyclopentenyl group or a cyclohexenyl group.

The alkynyl group may be a group in which at least one $CH_2$—$CH_2$ structure present in the alkyl group is replaced with a C≡C structure, and may, for example, be more specifically an ethynyl group, a1-propynyl group or a 2-propynyl group. $A_1$ and $A_2$ are more preferably a hydrogen atom or a $C_{1-5}$ alkyl group, particularly preferably a hydrogen atom, a methyl group or an ethyl group, since the reactivity of the amino group and the liquid crystal alignment property tend to decrease if a bulky structure is introduced.

In the above formula (2), Y is a bivalent organic group, and it may, for example, be specially the following formulae (Y-1) to (Y-115).

Particularly, in order to obtain favorable liquid crystal alignment property, it is preferred to use a diamine with high linearity. Y which achieves such an object may, for example, be Y-7, Y-10, Y-11, Y-12, Y-13, Y-21, Y-22, Y-23, Y-25, Y-26, Y-27, Y-41, Y-42, Y-43, Y-44, Y-45, Y-46, Y-48, Y-61, Y-63, Y-64, Y-71, Y-72, Y-73, Y-74, Y-75, Y-99, Y-100, Y-101, Y-103, Y-109, Y-110, Y-114 or Y-115. Such diamines may be used as a mixture of two or more.

The proportion of such a diamine is preferably from 40 to 100 mol %, more preferably from 60 to 100 mol % based on all the diamine components.

In a case where the pretilt angle is to be high, preferred is a diamine having, in its side chain, a long chain alkyl group, an aromatic ring, an aliphatic ring, a steroid skeleton or a combination thereof. Y which achieves such an object may, for example, be Y-76, Y-77, Y-78, Y-79, Y-80, Y-81, Y-82, Y-83, Y-84, Y-85, Y-86, Y-87, Y-88, Y-89, Y-90, Y-91, Y-92, Y-93, Y-94, Y-95, Y-96 or Y-97.

The proportion of such a diamine is preferably from 1 to 50 mol %, more preferably from 5 to 20 mol % based on all the diamine components.

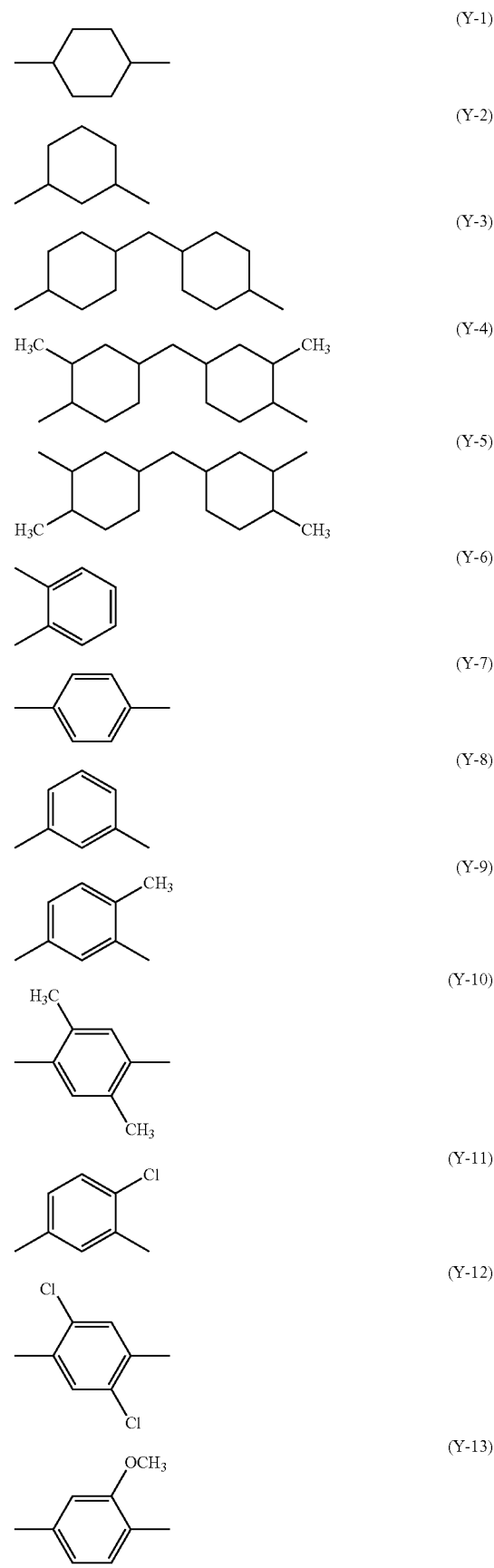

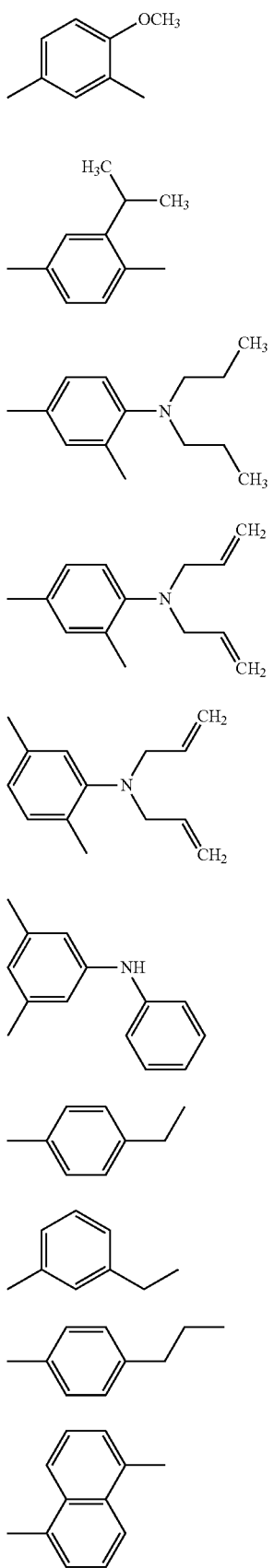
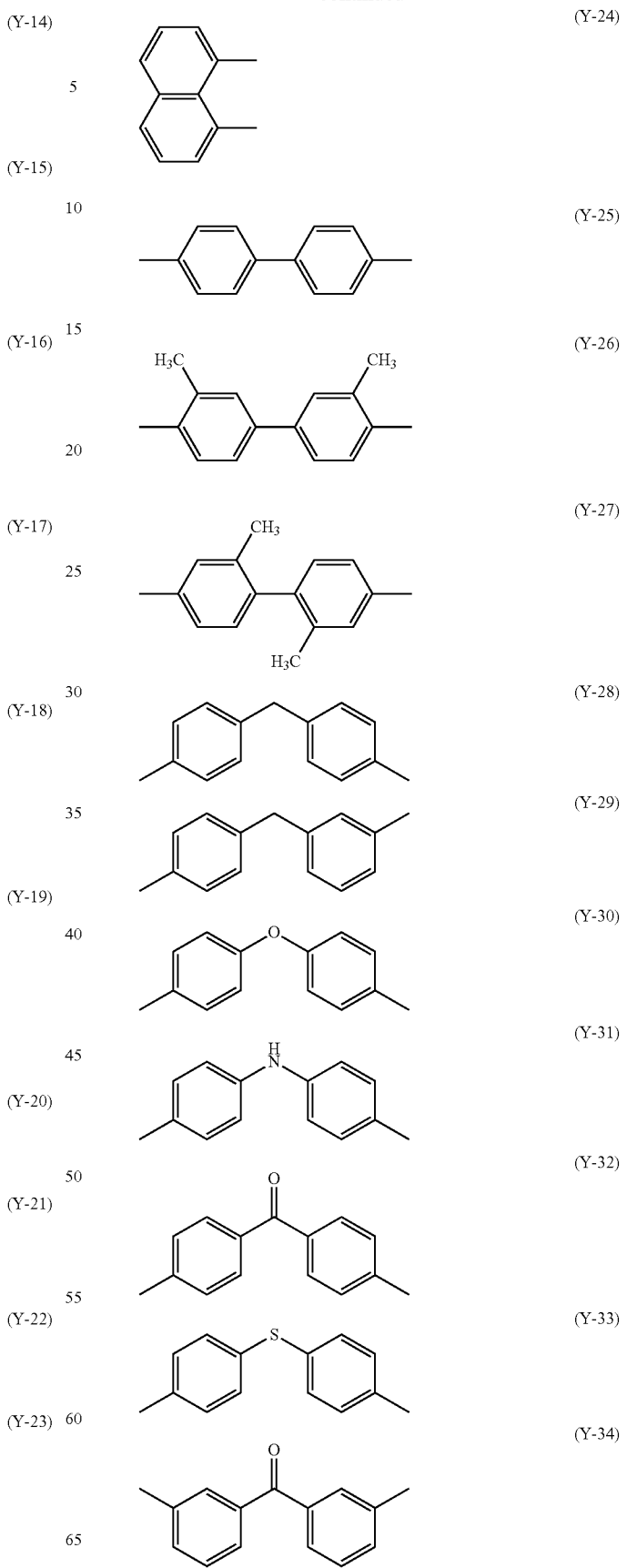

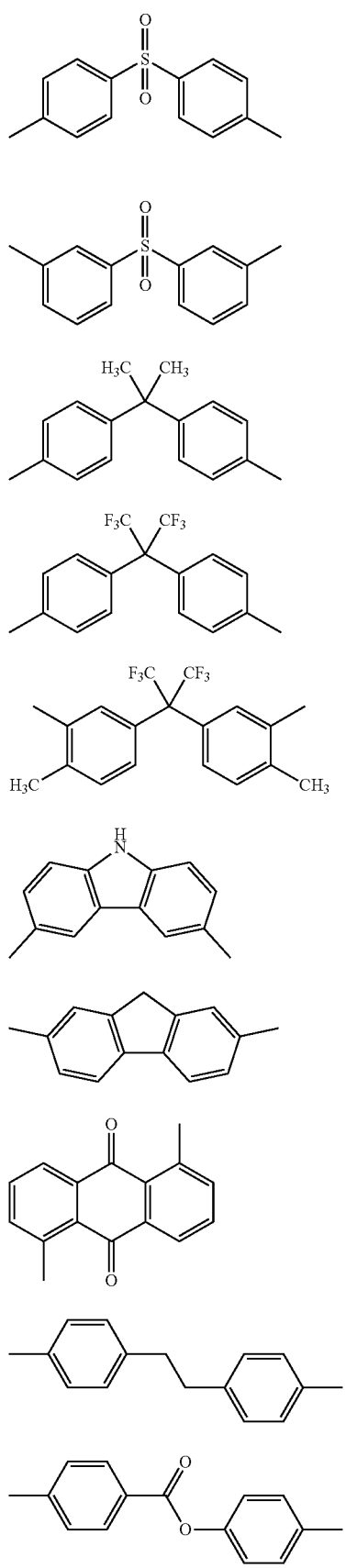

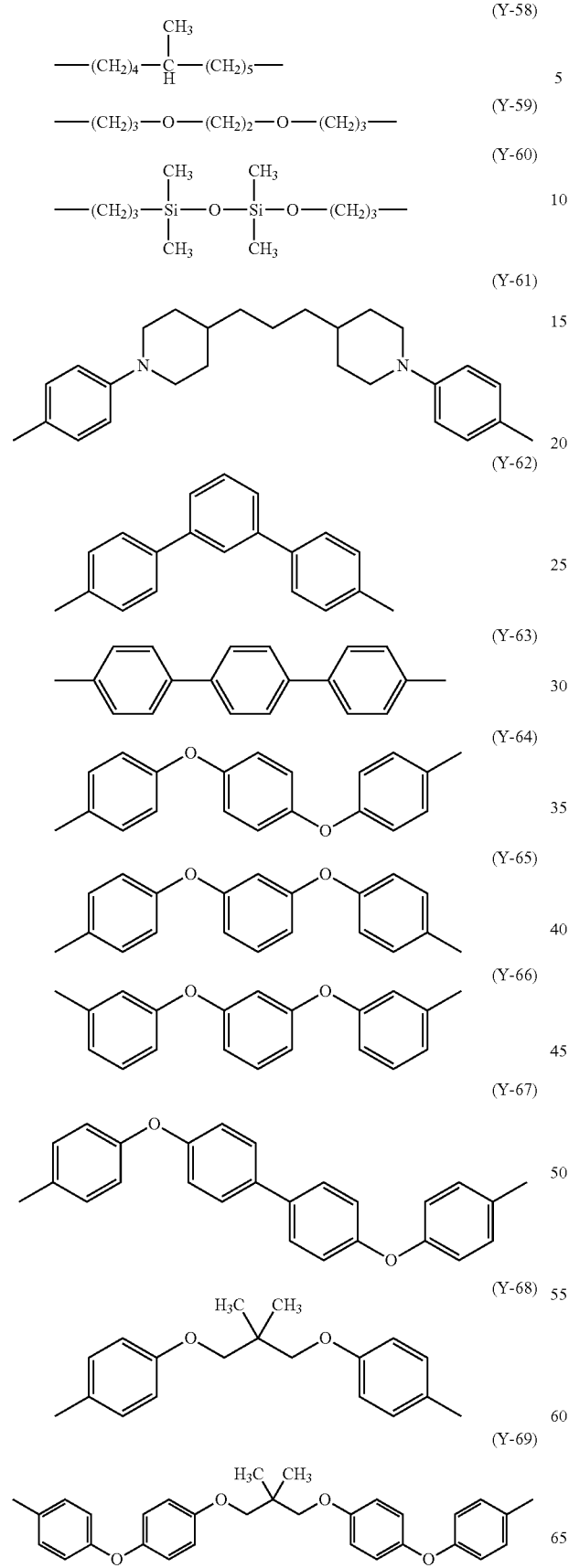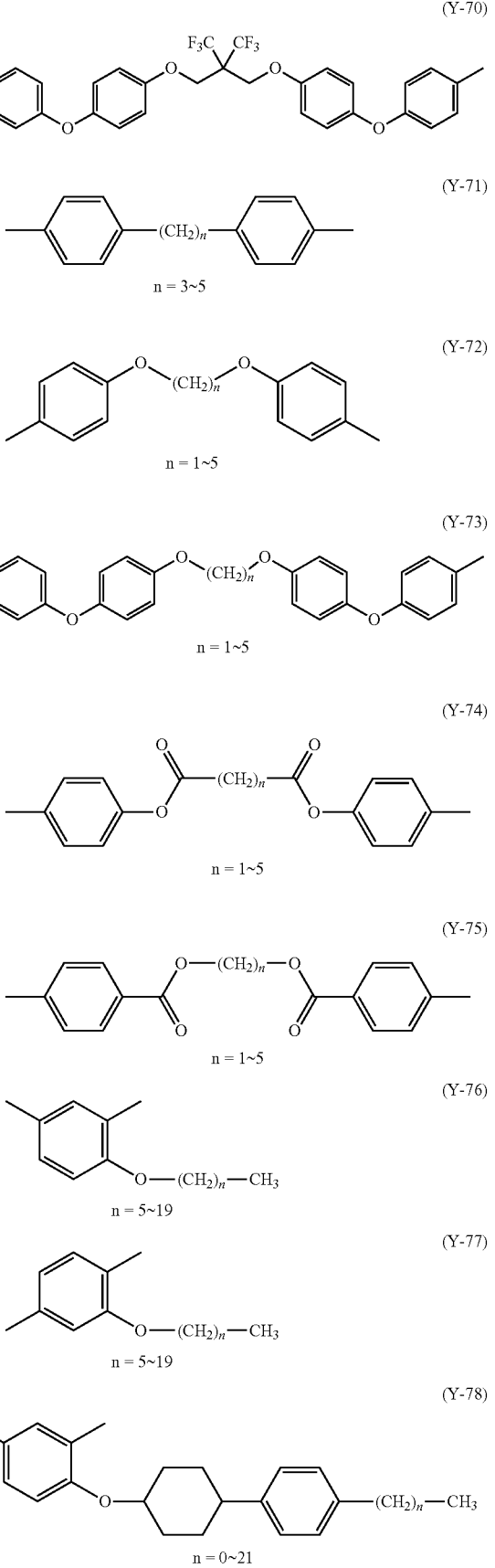

(Y-79)
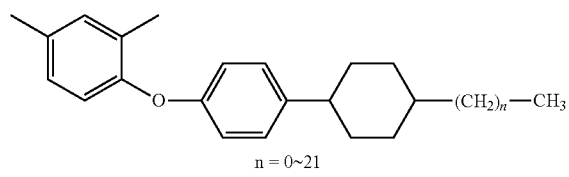
n = 0~21
(Y-80)
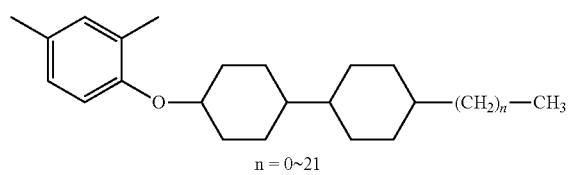
n = 0~21
(Y-81)
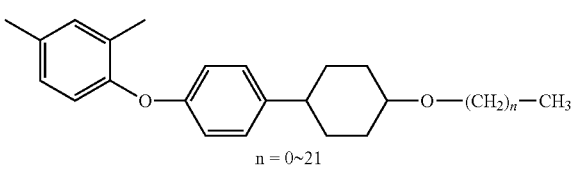
n = 0~21
(Y-82)
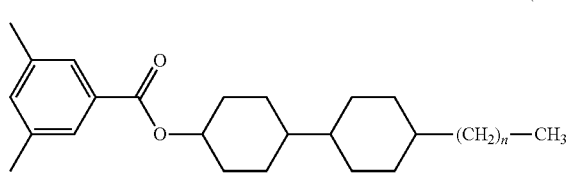
n = 0~21
(Y-83)
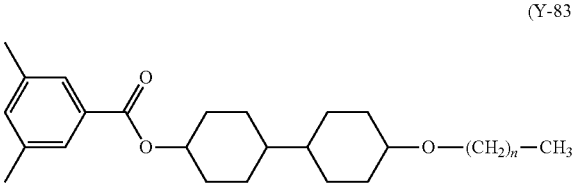
n = 0~21
(Y-84)
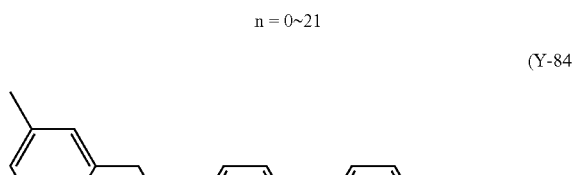
n = 0~21
(Y-85)
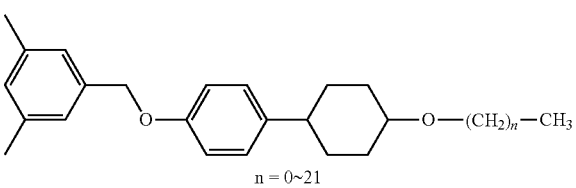
n = 0~21
(Y-86)
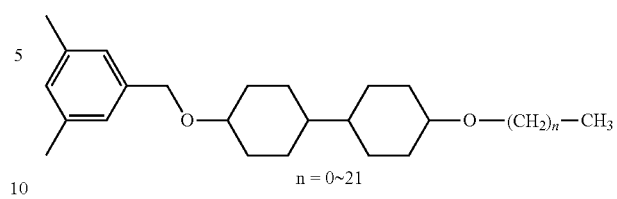
n = 0~21
(Y-87)
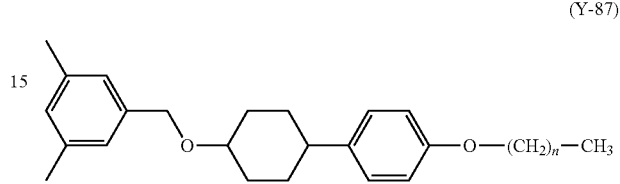
n = 0~21
(Y-88)
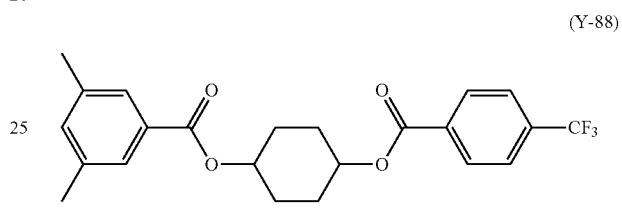
(Y-89)
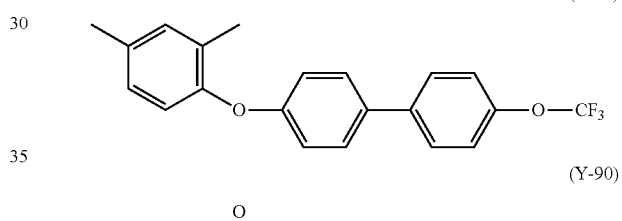
(Y-90)
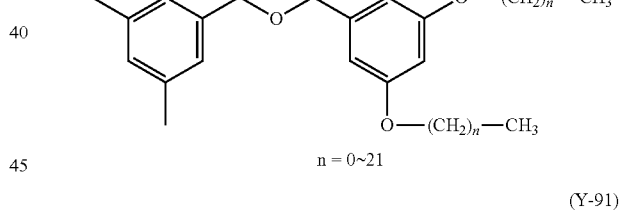
n = 0~21
(Y-91)
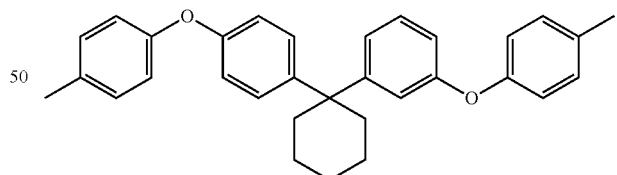
n = 0~21
(Y-92)
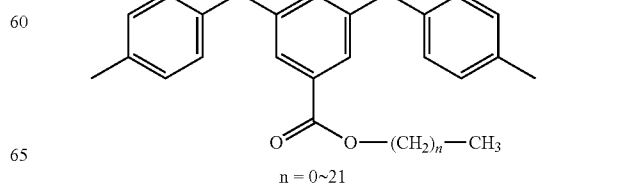
n = 0~21

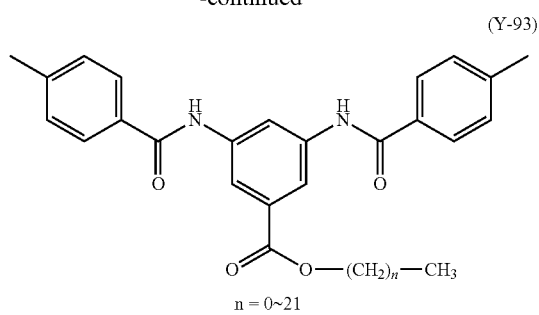
(Y-93)
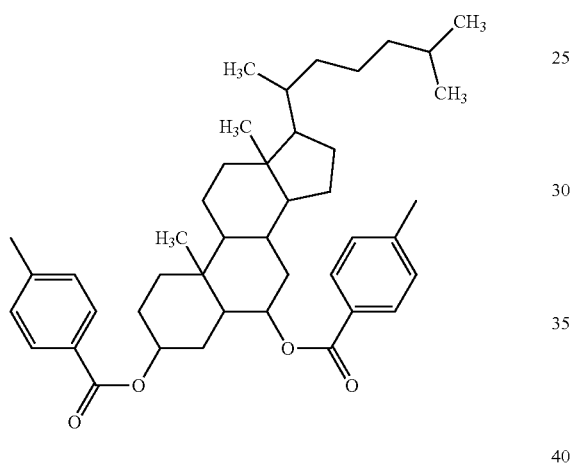
(Y-94)
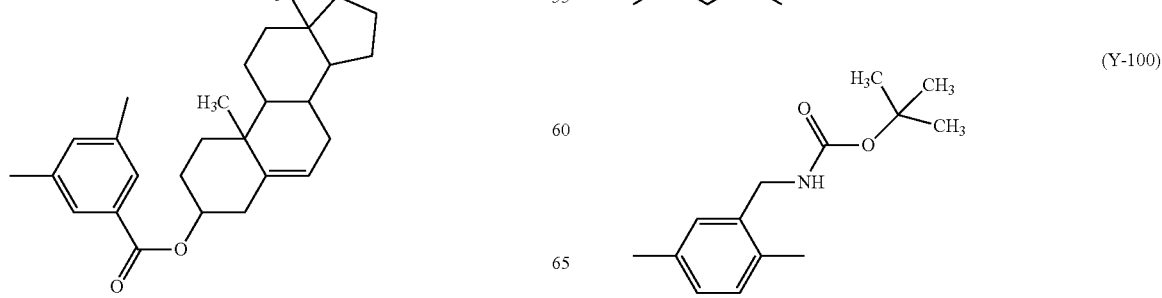
(Y-95)
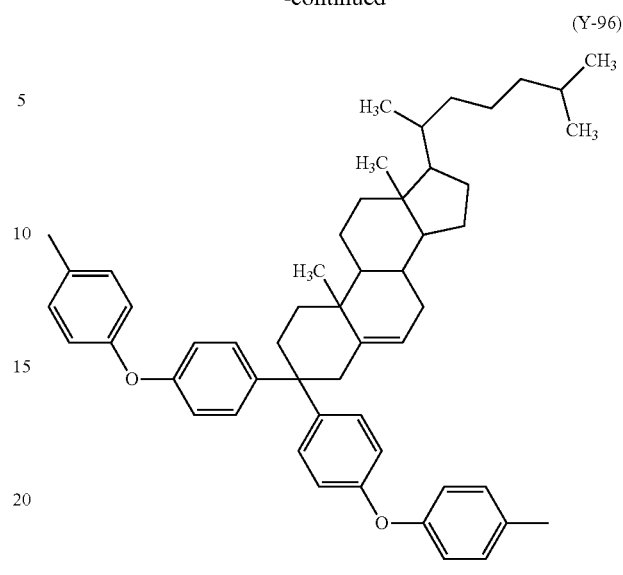
(Y-96)
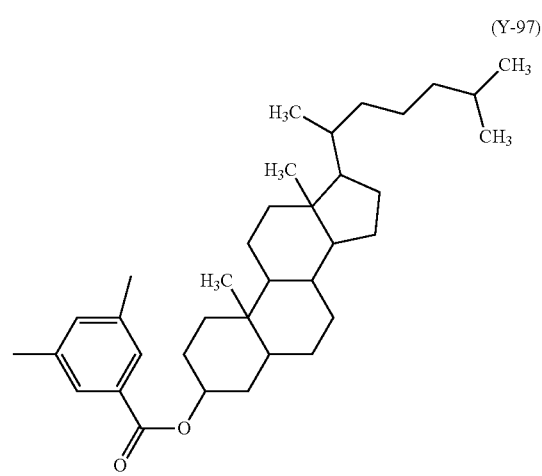
(Y-97)
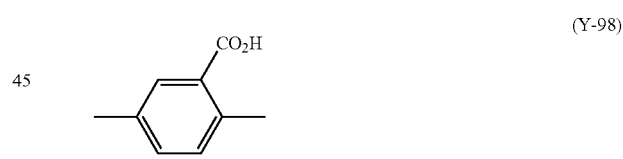
(Y-98)
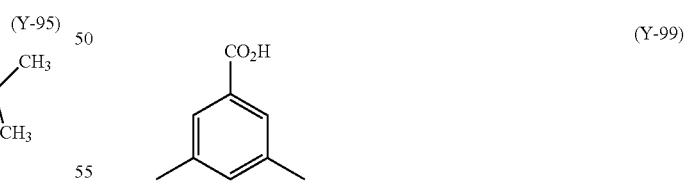
(Y-99)
(Y-100)

(Y-101) 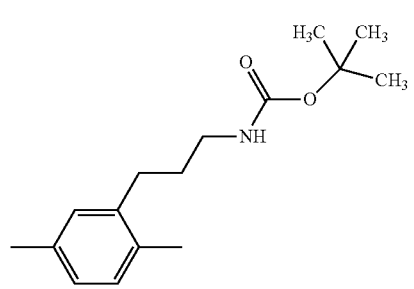
(Y-102) 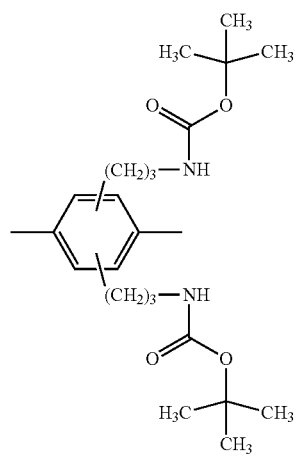
(Y-103) 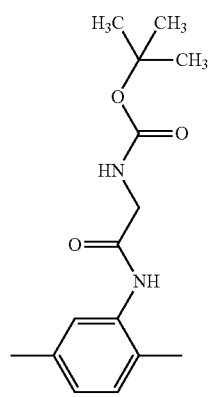
(Y-104) 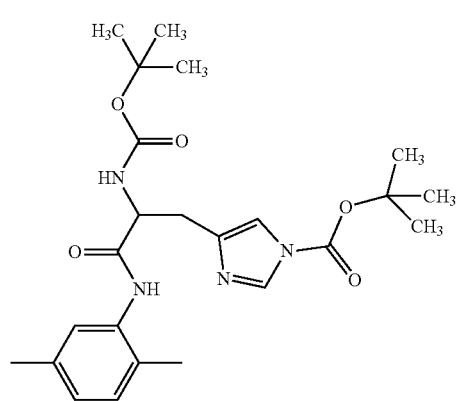
(Y-105) 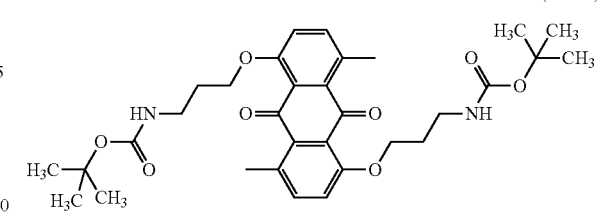
(Y-106) 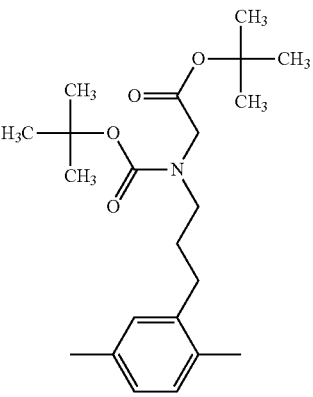
(Y-107) 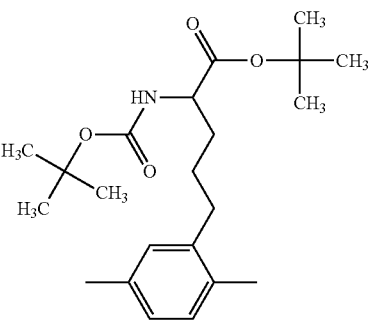
(Y-108) 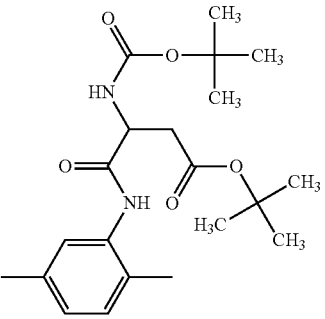
(Y-109) 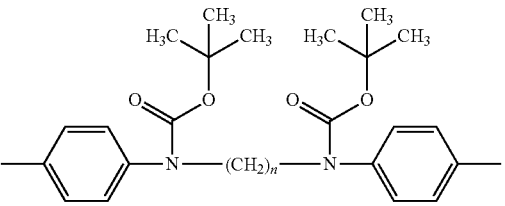
n = 2~5
(Y-110) 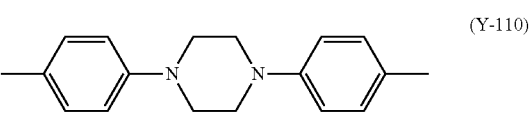

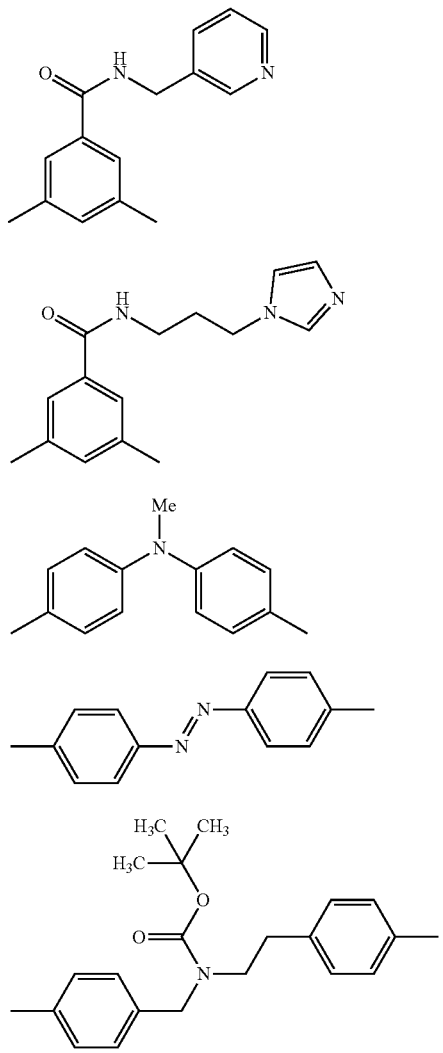

(Y-111)

(Y-112)

(Y-113)

(Y-114)

(Y-115)

Among the diamines represented by the above formula (2), preferred is a diamine represented by the following formula (4) in view of particularly excellent properties of a liquid crystal alignment film.

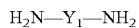 (4)

In the formula (4), $Y_1$ is preferably at least one member selected from the group consisting of structures represented by the following formulae:

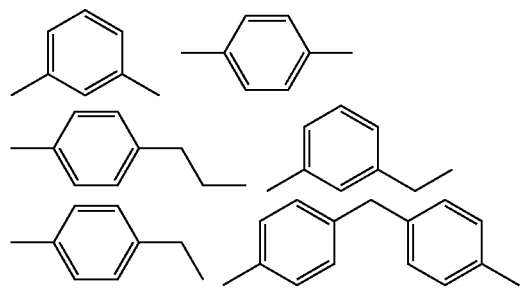

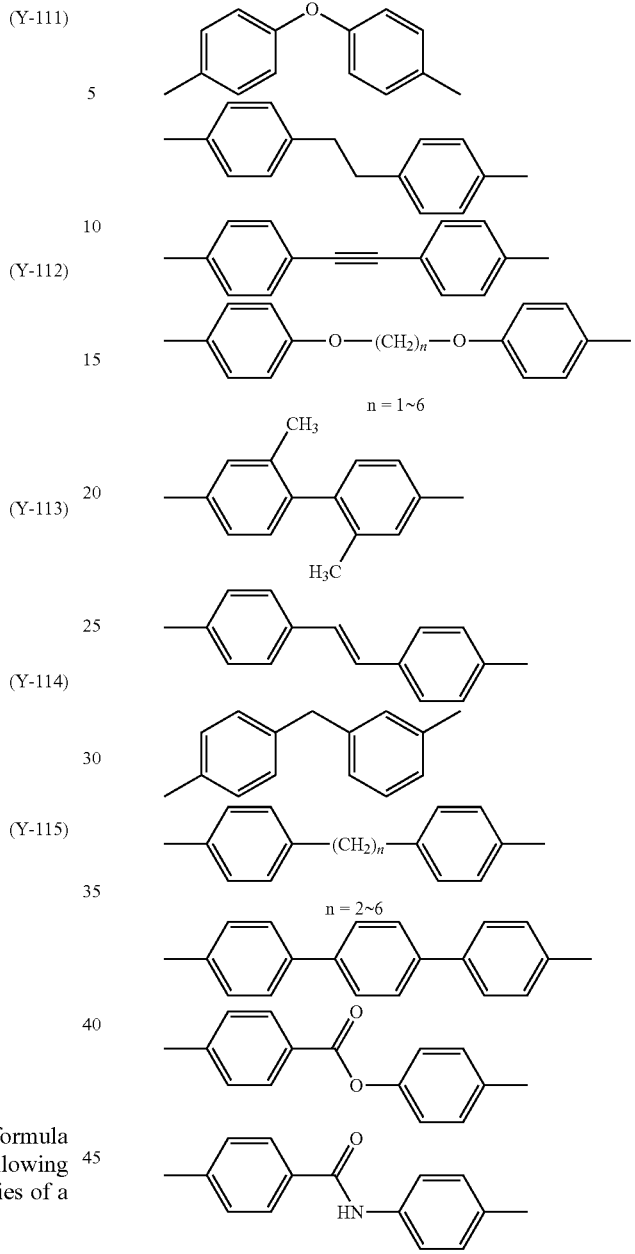

The proportion of the diamine represented by the above formula (4) is preferably from 60 to 100 mol %, more preferably from 80 to 100 mol % based on all the diamines to be reacted with the tetracarboxylic acid derivative.

<Method for Producing Polyamic Acid>

The polyamic acid which is a polyimide precursor to be used for the liquid crystal aligning agent to obtain the first alignment film, may be prepared by the following method. Specifically, a tetracarboxylic dianhydride and a diamine are reacted in the presence of an organic solvent at from −20° C. to 150° C., preferably from 0 to 50° C. for from 30 minutes to 24 hours, preferably from 1 to 12 hours.

The organic solvent to be used for the above reaction is preferably, in view of solubility of the monomer and the polymer, N,N-dimethylformamide, N-methyl-2-pyrrolidone, γ-butyrolactone or the like. They may be used as a mixture of two or more.

The concentration of the polymer in the reaction system is preferably from 1 to 30 mass %, more preferably from 5 to 20 mass %, whereby precipitation of the polymer is less likely to occur, and a high molecular weight product tends to be obtained. By pouring the reaction solution of the polyamic acid obtained into a poor solvent with well stirring, the polymer can be precipitated and recovered. Further, a powder of a purified polyamic acid can be obtained by carrying out precipitation several times, and washing the precipitate with a poor solvent and drying them at room temperature or by heating. The poor solvent is not particularly limited and may, for example, be water, methanol, ethanol, hexane, butyl cellosolve, acetone or toluene.

<Method for Producing Polyamic Acid Ester>

The polyamic acid ester which is a polyimide precursor to be used for the liquid crystal aligning agent to obtain the first alignment film, may be prepared by the following method (1), (2) or (3).

(1) Preparation from Polyamic Acid

The polyamic acid ester may be prepared by esterifying a polyamic acid obtainable from a tetracarboxylic dianhydride and a diamine. Specifically, it may be prepared by reacting the polyamic acid and an esterifying agent in an organic solvent at from −20° C. to 150° C., preferably from 0° C. to 50° C. for from 30 minutes to 24 hours, preferably from 1 to 4 hours.

The esterifying agent is preferably one which can readily be removed by purification, and may, for example, be N,N-dimethylformamide dimethyl acetal, N,N-dimethylformamide diethyl acetal, N,N-dimethylformamide dipropyl acetal, N,N-dimethylformamide dineopentylbutyl acetal, N,N-dimethylformamide di-t-butyl acetal, 1-methyl-3-p-tolyltriazene, 1-ethyl-3-p-tolyltriazene, 1-propyl-3-p-tolyltriazene or 4-(4,6-dimethoxy-1,3,5-triazin-2-yl)-4-methylmorpholinium chloride. The amount of the esterifying agent is preferably from 2 to 6 molar equivalent per 1 mole of the repeating units of the polyamic acid.

The organic solvent to be used for the above reaction is preferably N,N-dimethylformamide, N-methyl-2-pyrrolidone or γ-butyrolactone in view of the solubility of the polymer. They may be used as a mixture of two or more. The polymer concentration at the time of preparation is preferably from 1 to 30 mass %, more preferably from 5 to 20 mass %, whereby precipitation of the polymer is less likely to occur, and a high molecular weight product tends to be obtained.

(2) Preparation by Reaction of Tetracarboxylic Acid Diester Dichloride and Diamine The polyamic acid ester may be prepared from tetracarboxylic acid diester dichloride and a diamine.

Specifically, the polyamic acid ester may be prepared by reacting tetracarboxylic acid diester dichloride and a diamine in the presence of a base and an organic solvent at from −20 to 150° C., preferably from 0 to 50° C. for from 30 minutes to 24 hours, preferably from 1 to 4 hours.

As the base, pyridine, triethylamine, 4-dimethylaminopyridine or the like may be used, and pyridine is preferred, whereby the reaction will moderately proceed. The amount of the base is preferably from 2 to 4 molar times based on tetracarboxylic acid diester dichloride, whereby the base will easily be removed, and a high molecular weight product tends to be obtained.

The organic solvent to be used for the above reaction is preferably N-methyl-2-pyrrolidone or γ-butyrolactone in view of the solubility of the monomer and the polymer, and they may be used as a mixture of two or more. The polymer concentration at the time of preparation is preferably from 1 to 30 mass %, more preferably from 5 to 20 mass %, whereby precipitation of the polymer is less likely to occur, and a high molecular weight product tends to be obtained. Further, in order to prevent hydrolysis of tetracarboxylic acid diester dichloride, the solvent to be used for preparation of the polyamic acid ester is preferably dehydrated as far as possible, and it is preferred to carry out the reaction in a nitrogen atmosphere while inclusion of outdoor air is prevented.

(C) Preparation from Tetracarboxylic Acid Diester and Diamine

The polyamic acid ester may be prepared by subjecting tetracarboxylic acid diester and a diamine to polycondensation. Specifically, the polyamic acid ester may be prepared by reacting tetracarboxylic acid diester and a diamine in the presence of a condensation agent, a base and an organic solvent at from 0° C. to 150° C., preferably from 0° C. to 100° C. for from 30 minutes to 24 hours, preferably from 3 to 15 hours.

The condensation agent may, for example, be triphenyl phosphite, dicyclohexylcarbodiimide, 1-ethyl-3-(3-dimethylaminopropyl)carbodiimide hydrochloride, N,N'-carbonyldiimidazole, dimethoxy-1,3,5-triazinylmethyl morpholinium, O-(benzotriazol-1-yl)-N,N,N',N'-tetramethyluronium tetrafluoroborate, O-(benzotriazol-1-yl)-N,N,N',N'-tetramethyluronium hexafluorophosphate or diphenyl (2,3-dihydro-2-thioxo-3-benzoxazolyl)phosphonate. The amount of the condensation agent is preferably from 2 to 3 molar times based on tetracarboxylic acid diester.

As the base, a tertiary amine such as pyridine or triethylamine may be used. The amount of the base is preferably from 2 to 4 molar times based on the diamine component, whereby the base will easily be removed, and a high molecular weight product tends to be obtained.

Further, in the above reaction, the reaction will efficiently proceed by adding a Lewis acid as an additive. The Lewis acid is preferably a lithium halide such as lithium chloride or lithium bromide. The amount of the Lewis acid is preferably from 0 to 1.0 molar time based on the diamine component.

Among the above three methods for preparing the polyamic acid ester, particularly preferred is the method (1) or (2), whereby a high molecular weight polyamic acid ester will be obtained.

By pouring the solution of the polyamic acid ester obtained as mentioned above into a poor solvent with well stirring, the polymer can be precipitated. Precipitation is carried out several times, and the precipitate is washed with a poor solvent and dried at room temperature or by heating, whereby a powder of a purified polyamic acid ester can be obtained. The poor solvent is not particularly limited and may, for example, be water, methanol, ethanol, hexane, butyl cellosolve, acetone or toluene.

<Method for Producing Polyimide>

The polyimide contained in the first alignment film is obtainable by imidizing the above polyamic acid ester or polyamic acid, which is the polyimide precursor. The imidizing method is not particularly limited, and is preferably a method for producing a polyimide from a polyamic acid.

In a case where the polyimide is prepared from the polyamic acid, chemical imidization of adding a catalyst to a solution of the polyamic acid obtained by the reaction of the diamine component and tetracarboxylic dianhydride is easily conducted.

Chemical imidization is preferred in that the imidization reaction will proceed at a relatively low temperature, and a decrease in the molecular weight of the obtainable polymer is less likely to occur in the procedure of imidization.

Chemical imidization may be carried out by stirring the polymer to be imidized in an organic solvent in the presence of a basic catalyst and an acid anhydride. As the organic solvent, the solvent to be used in the above-described polymerization reaction may be used. The basic catalyst may, for example, be pyridine, triethylamine, trimethylamine, tributylamine or trioctylamine. Among them, pyridine, which has appropriate basicity to make the reaction proceed, is preferred. Further, the acid anhydride may, for example, be acetic anhydride, trimellitic anhydride or pyromellitic anhydride, and among them, acetic anhydride is preferred, whereby purification after completion of the reaction will readily be carried out.

The imidization reaction temperature is from −20° C. to 140° C., preferably from 0° C. to 100° C., and the reaction time is from 1 to 100 hours. The amount of the basic catalyst is from 0.5 to 30 molar times, preferably from 2 to 20 molar times the amount of the amic acid groups, and the amount of the acid anhydride is from 1 to 50 molar times, preferably from 3 to 30 molar times the amount of the amic acid groups. The imidization degree of the polymer may be controlled by adjusting the amount of the catalyst, the temperature and the reaction time.

Since the added catalyst and the like remain in the solution after the imidization reaction of the polyamic acid ester or the polyamic acid, it is preferred that the obtained imidized polymer is recovered and dissolved again in an organic solvent to obtain the liquid crystal aligning agent by the following means.

By pouring the solution of the polyimide obtained as mentioned above into a poor solvent with well stirring, the polyimide can be precipitated. Precipitation is carried out several times, and the precipitate is washed with a poor solvent and dried at room temperature or by heating, whereby a powder of a purified polyimide can be obtained.

The poor solvent is not particularly limited and may, for example, be methanol, acetone, hexane, butyl cellosolve, heptane, methyl ethyl ketone, methyl isobutyl ketone, ethanol, toluene or benzene.

<First Liquid Crystal Aligning Agent>

The molecular weight of the polyimide precursor or the polyimide (hereinafter they will sometimes generically be referred to as a polymer) contained in the first liquid crystal aligning agent for forming the first alignment film, is by the weight average molecular weight, preferably from 2,000 to 500,000, more preferably from 5,000 to 300,000, further preferably from 10,000 to 100,000. Further, the number average molecular weight is preferably from 1,000 to 250,000, more preferably from 2,500 to 150,000, further preferably from 5,000 to 50,000.

The polymer concentration in the liquid crystal aligning agent may be properly changed depending upon the desired thickness of the coating film to be formed, and it is preferably at least 1 mass % from the viewpoint such that a uniform coating film without defect is to be formed, and is preferably at most 10 mass % in view of the storage stability of the solution. The polymer concentration is particularly preferably from 2 to 8 mass %.

The organic solvent contained in the first liquid crystal aligning agent is not particularly limited so long as the polymer contained is uniformly soluble in it. It may, for example, be specifically N,N-dimethylformamide, N,N-diethylformamide, N,N-dimethylacetamide, N-methyl-2-pyrrolidone, N-ethyl-2-pyrrolidone, N-methylcaprolactam, 2-pyrrolidone, N-vinyl-2-pyrrolidone, dimethylsulfoxide, dimethylsulfone, γ-butyrolactone, 1,3-dimethyl-imidazolidinone or 3-methoxy-N,N-dimethylpropanamide. They may be used as a mixture of two or more.

The first liquid crystal aligning agent may contain, in addition to the organic solvent to dissolve the polymer component, a solvent to improve the coating film uniformity when the liquid crystal aligning agent is applied to the substrate. Such a solvent is preferably a solvent having a lower surface tension than the above organic solvent. It may, for example, be specifically ethyl cellosolve, butyl cellosolve, ethyl carbitol, butyl carbitol, ethyl carbitol acetate, ethylene glycol, 1-methoxy-2-propanol, 1-ethoxy-2-propanol, 1-butoxy-2-propanol, 1-phenoxy-2-propanol, propylene glycol monoacetate, propylene glycol diacetate, propylene glycol-1-monoethyl ether-2-acetate, propylene glycol-1-monoethyl ether-2-acetate, butyl cellosolve acetate, dipropylene glycol, 2-(2-ethoxypropoxy)propanol, lactic acid methyl ester, lactic acid ethyl ester, lactic acid n-propyl ester, lactic acid n-butyl ester or lactic acid isoamyl ester. The solvents may be used in combination of two or more.

To the first liquid crystal aligning agent in addition to the above, within a range not to impair the effects of the present invention, a dielectric or conductive substance for the purpose of changing electrical properties such as the dielectric constant or the electrical conductivity of the obtainable liquid crystal alignment film, a silane coupling agent for the purpose of improving the adhesion between the liquid crystal alignment film and the substrate, a crosslinkable compound for the purpose of increasing the hardness and denseness of a liquid crystal alignment film obtained, etc. may be added. Further, it may contain a solvent or compound which improves the film thickness uniformity and the surface smoothness, a compound which improves the adhesion between the liquid crystal alignment film and the substrate, etc. when the liquid crystal aligning agent is applied, to be described in the after-mentioned second liquid crystal aligning agent.

<Method for Producing First Alignment Film>

The first alignment film is obtained by applying the first liquid crystal aligning agent to the first substrate, followed by drying and baking, and irradiating the coating film surface with polarized ultraviolet rays.

As a method of applying the first liquid crystal aligning agent, a spin coating method, a printing method or an ink jet method may, for example, be mentioned. For the drying and baking steps after application of the first liquid crystal aligning agent, usually, in order to sufficiently remove the organic solvent contained, the liquid crystal aligning agent is dried at from 50 to 120° C. for from 1 minute to 10 minutes, and baked at from 150 to 300° C. for from 5 minutes to 120 minutes. The thickness of the coating film after baking is not particularly limited, however, if the coating film is too thin, the reliability of a liquid crystal display device may be lowered in some cases, and accordingly it is from 5 to 300 nm, preferably from 10 to 200 nm.

The first liquid crystal aligning agent is used to treat the film by a photo-alignment treatment method. As a specific example of the photo-alignment treatment, a method of irradiating the coating film surface with ultraviolet rays polarized in a constant direction, and in some cases, further subjecting the coating film to a heat treatment at a temperature of from 150 to 250° C. to impart liquid crystal alignment performance. The wavelength of the ultraviolet rays to be applied is preferably from 100 to 400 nm, particularly preferably from 200 to 400 nm.

Further, in order to improve the liquid crystal alignment property, the coating film may be irradiated with radioactive rays while it is heated at from 50 to 250° C. The amount of irradiation with radioactive rays is preferably from 1 to 10,000 mJ/cm², particularly preferably from 100 to 5,000 mJ/cm².

Further, the liquid crystal alignment film subjected to the alignment treatment may be subjected to the following contact treatment. The solvent to be used for the contact treatment is not particularly limited so long as a decomposed product formed from the liquid crystal alignment film by irradiation with radioactive rays is dissolved. It may, for example, be specifically water, or a hydrophilic solvent methanol, ethanol, 2-propanol, acetone, methyl ethyl ketone, 1-methoxy-2-propanol, 1-methoxy-2-propanol acetate, butyl cellosolve, ethyl lactate, methyl lactate, diacetone alcohol, methyl 3-methoxypropionate, ethyl 3-ethoxypropionate, propyl acetate, butyl acetate or cyclohexyl acetate.

Among them, in view of general purpose property and the safety of the solvent, preferred is water, 2-propanol, 1-methoxy-2-propanol or ethyl lactate. More preferred is water, 1-methoxy-2-propanol or ethyl lactate. The solvent may be used in combination of two or more.

As a means of the contact treatment, a dipping treatment or a spray treatment may be mentioned. The treatment time in the contact treatment is preferably from 10 seconds to 1 hour in order that the decomposed product formed from the liquid crystal alignment film by radioactive rays is efficiently dissolved. It is particularly preferred to conduct the dipping treatment for from 1 minute to 30 minutes. Further, the solvent at the time of the contact treatment may be at room temperature or may be heated, and the temperature of the solvent is preferably from 10 to 80° C., particularly preferably from 20 to 50° C. Further, in order to promote dissolution of the decomposed product, as the case requires, an ultrasonic irradiation treatment or the like may be conducted in combination.

It is preferred to conduct, after the above contact treatment, rinsing with a low boiling point solvent such as water, methanol, ethanol, 2-propanol, acetone or methyl ethyl ketone, or baking of the liquid crystal alignment film. On that occasion, either one of rinsing and baking may be conducted, or both may be conducted. The baking temperature is preferably from 150 to 300° C., more preferably from 180 to 250° C., particularly preferably from 200 to 230° C. The baking time is preferably from 10 seconds to 30 minutes, more preferably from 1 to 10 minutes.

<Second Substrate>

On the second substrate which the liquid crystal display device of the present invention has, the second liquid crystal alignment film (hereinafter sometimes referred to as a second alignment film in this specification) is formed. The second substrate in an in-plane switching mode display device is preferably a transparent substrate, and has a color filter, a black matrix (BM), an overcoat layer, etc. formed thereon. The structure of the second substrate is known and may be disclosed, for example, in JP-A-2013-234076.

<Second Alignment Film>

The second alignment film has an alignment film obtainable from a liquid crystal aligning agent (hereinafter sometimes referred to as a second liquid crystal aligning agent) containing a photosensitive side chain type polymer which develops liquid crystallinity dependent on the temperature (hereinafter sometimes referred to as a photosensitive side chain type polymer).

The temperature range within which the photosensitive side chain type polymer develops liquid crystallinity is preferably from 100 to 250° C., more preferably from 100 to 200° C., particularly preferably from 100 to 150° C.

The main chain structure of the above photosensitive side chain type polymer is not particularly limited and preferably has polymer units in a polymer of polyethylene, poly(meth) acrylate, polymaleimide, polynorbornene or polysiloxane. Among them, preferred is one having polymer units of a polymer of poly(meth)acrylate or polysiloxane.

The side chain structure of the photosensitive side chain type polymer is not particularly limited and is preferably either one or both of (A) a side chain structure having photo-reactivity (hereinafter sometimes referred to as a photoreactive side chain structure) and (B) a side chain structure having liquid crystallinity (hereinafter sometimes referred to as a liquid crystalline side chain structure). Further, the side chain type polymer may have two or more of photoreactive side chain structures and two or more of liquid crystalline side chain structures, respectively.

[Photoreactive Side Chain Structure]

The photoreactive side chain structure is preferably a structure which is sensitive to light to undergo crosslinking reaction, isomerization reaction or photo Fries rearrangement, more preferably a structure to undergo crosslinking reaction or isomerization reaction. Specifically, the following structure or a structure of its derivative is preferred.

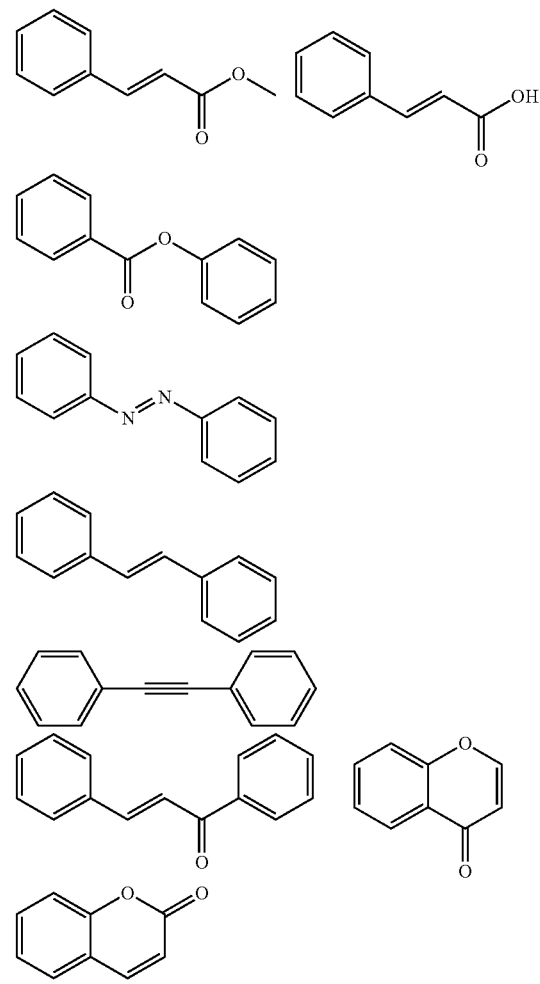

As more specific examples of the photoreactive side chain structure, preferred is at least one structure represented by the following formulae (Z-1) to (Z-4):

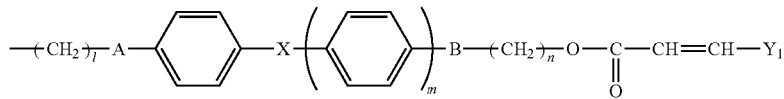
(Z-1)

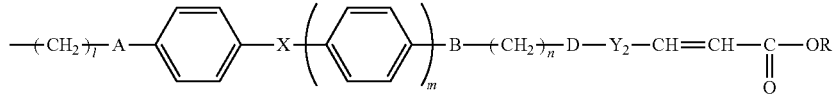
(Z-2)

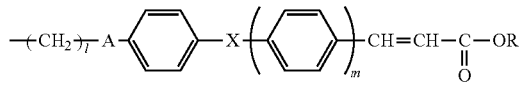
(Z-3)

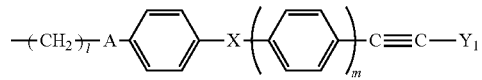
(Z-4)

In the above formulae (Z-1) to (Z-4), A, B and D are each independently a single bond, —O—, —CH$_2$—, —COO—, —OCO—, —CONN— or —NH—CO—. $Y_1$ is a monovalent benzene ring, naphthalene ring, biphenyl ring, furan ring, pyrrole ring or C$_{5-8}$ cyclic hydrocarbon, the hydrogen atom of which may be substituted by —NO$_2$, —CN, —C═C(CN)$_2$, —C═CH—CN, a halogen atom, an alkyl group or an alkyloxy group. X is a single bond, —COO—, —OCO—, —N═N—, —C═C— or —C≡C—. l is an integer of from 1 to 12, m is an integer of from 0 to 2, and n is an integer of from 1 to 12. $Y_2$ is a bivalent benzene ring, naphthalene ring, biphenyl ring, furan ring, pyrrole ring or C$_{5-8}$ cyclic hydrocarbon, the hydrogen atom of which may be substituted by —NO$_2$, —CN, —C═C(CN)$_2$, —C═CH—CN, a halogen atom, an alkyl group or an alkyloxy group. R is a hydrogen atom or a C$_{1-6}$ alkyl group.

The photoreactive side chain structure may be a structure which develops not only photo-reactivity but also liquid crystallinity when formed into a polymer.

[Liquid Crystalline Side Chain Structure]

The liquid crystalline side chain structure is not particularly limited and preferably has a rigid mesogen component in its side chain structure. When such a side chain type polymer is used to obtain a liquid crystal alignment film, stable liquid crystal alignment can be achieved.

The mesogen group may constitute a mesogen structure by itself, like biphenyl, phenyl benzoate or the like, or may constitute a mesogen structure by side chains bonded by a hydrogen bond, like benzoic acid or the like. The mesogen group which the liquid crystalline side chain structure has is preferably any one of the following structures.

As more specific examples of the liquid crystalline side chain structure, preferred is at least one structure selected from the group consisting of the following formulae (Z-9) to (Z-17):

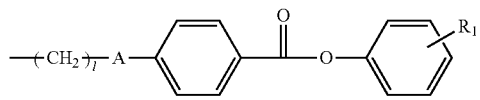
(Z-9)

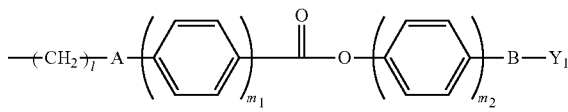
(Z-10)

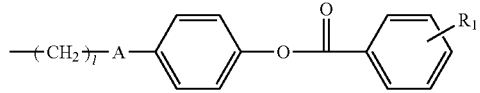 (Z-11)
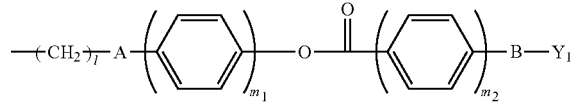 (Z-12)

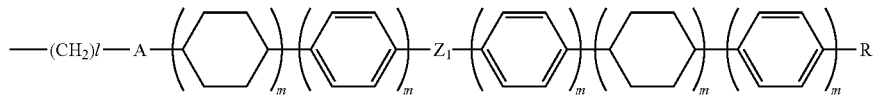 (Z-13)

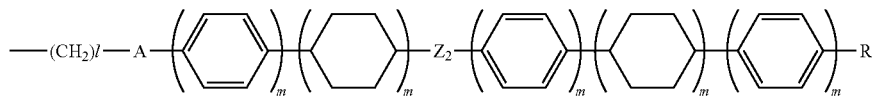 (Z-14)

(Z-15) 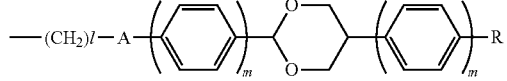 (Z-16)

(Z-17)
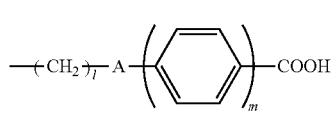

In the above formulae (Z-9) to (Z-17), A and B are each independently a single bond, —O—, —CH$_2$—, —COO—, —OCO—, —CONN— or —NH—CO—. $Y_1$ is a monovalent benzene ring, naphthalene ring, biphenyl ring, furan ring, pyrrole ring or $C_{5-8}$ cyclic hydrocarbon, the hydrogen atom of which may be independently substituted by —NO$_2$, —CN, —C=C(CN)$_2$, —C=CH—CN, a halogen atom, an alkyl group or an alkyloxy group. R is a hydrogen atom, —NO$_2$, —CN, —C=C(CN)$_2$, —C=CH—CN, a halogen atom, a $C_{1-12}$ alkyl group or a $C_{1-12}$ alkoxy group. I is an integer of from 1 to 12, m, m1 and m2 are each independently an integer of from 1 to 3. $R_1$ is a hydrogen atom, —NO$_2$, —CN, —C=C(CN)$_2$, —C=CH—CN, a halogen atom, an alkyl group or an alkyloxy group, and $Z_1$ and $Z_2$ are each independently —CO—, —CH$_2$O—, —C=N— or —CF$_2$—.

The photosensitive side chain type polymer may have another monomer or another side chain structure within a range not to impair the ability to develop liquid crystallinity.

The method for producing the photosensitive side chain type polymer is not particularly limited, and an industrially employed known method may be employed. Specifically, the photosensitive side chain type polymer may be produced by cationic polymerization, radical polymerization or anionic polymerization using a vinyl group of the liquid crystalline side chain monomer or the photoreactive side chain monomer. Among them, particularly preferred is radical polymerization from the viewpoint of easiness of controlling the reactivity.

As a polymerization initiator for radical polymerization, a known compound such as a radical polymerization initiator or a reversible addition-fragmentation chain transfer (RAFT) polymerization reagent may be used.

The radical thermal polymerization initiator is a compound which generates radicals when heated to the decomposition temperature or higher, and such a radical thermal polymerization initiator may, for example, be a ketone peroxide (such as methyl ethyl ketone peroxide or cyclohexanone peroxide), a diacyl peroxide (such as acetyl peroxide or benzoyl peroxide), a hydroperoxide (such as hydrogen peroxide, tert-butyl hydroperoxide or cumene hydroperoxide), a dialkyl peroxide (such as di-tert-butyl peroxide, dicumyl peroxide or dilauroyl peroxide), a peroxyketal (such as dibutylperoxy cyclohexane), an alkyl perester (such as tert-butyl peroxyneodecanoate, tert-butyl peroxypivalate, or tert-amyl peroxy 2-ethylcyclohexanoate), a persulfate (such as potassium persulfate, sodium persulfate or ammonium persulfate), or an azo compound (such as azobisisobutylonitrile or 2,2'-di(2-hydroxyethyl)azobisisobutylonitrile). The radical thermal polymerization initiator may be used in combination of two or more.

The radical photopolymerization initiator is not particularly limited so long as it is a compound which initiates radical polymerization by light irradiation. Such a radical photopolymerization initiator may, for example, be benzophenone, Michler's ketone, 4,4'-bis(diethylamino)benzophenone, xanthone, thioxanthone, isopropylxanthone, 2,4-diethylthioxanthone, 2-ethylanthraquinone, acetophenone, 2-hydroxy-2-methylpropiophenone, 2-hydroxy-2-methyl-4'-isopropylpropiophenone, 1-hydroxycyclohexyl phenyl ketone, isopropylbenzoin ether, isobutylbenzoin ether, 2,2-diethoxyacetophenone, 2,2-dimethoxy-2-phenylacetophenone, camphorquinone, benzanthrone, 2-methyl-1-[4-(methylthio)phenyl]-2-morpholinopropan-1-one, 2-benzyl-2-dimethylamino-1-(4-morpholinophenyl)-butanone-1, ethyl 4-dimethylaminobenzoate, isoamyl 4-dimethylaminobenzoate, 4,4'-di(t-butylperoxycarbonyl)benzophenone, 3,4,4'-tri(t-butylperoxycarbonyl)benzophenone, 2,4,6-trimethylbenzoyl diphenylphosphine oxide, 2-(4'-methoxystyryl)-4,6-bis(trichloromethyl)-s-triazine, 2-(3',4'-dimethoxystyryl)-4,6-bis(trichloromethyl)-s-triazine, 2-(2',4'-dimethoxystyryl)-4,6-bis(trichloromethyl)-s-triazine, 2-(2'-methoxystyryl)-4,6-bis(trichloromethyl)-s-triazine, 2-(4'-pentyloxystyryl)-4,6-bis(trichloromethyl)-s-triazine, 4-[p-N,N-di(ethoxycarbonylmethyl)]-2,6-di(trichloromethyl)-s-triazine, 1,3-bis(trichloromethyl)-5-(2'-chlorophenyl)-s-triazine, 1,3-bis(trichloromethyl)-5-(4'-methoxyphenyl)-s-triazine, 2-(p-dimethylaminostyryl)benzoxazole, 2-(p-dimethylaminostyryl)benzothiazole, 2-mercaptobenzothiazole, 3,3'-carbonylbis(7-diethylaminocoumarin), 2-(o- chlorophenyl)-4,4',5,5'-tetraphenyl-1,2'-biimidazole, 2,2'-bis(2-chlorophenyl)-4,4',5,5'-tetrakis(4-ethoxycarbonylphenyl)-1,2'-biimidazole, 2,2'-bis(2,4-dichlorophenyl)-4,4',5,5'-tetraphenyl-1,2'-biimidazole, 2,2'bis(2,4-dibromophenyl)-4,4',5,5'-tetraphenyl-1,2'-biimidazole, 2,2'-bis(2,4,6-trichlorophenyl)-4,4',5,5'-tetraphenyl-1,2'-biimidazole, 3-(2-methyl-2-dimethylaminopropionyl)carbazole, 3,6-bis(2-methyl-2-morpholinopropionyl)-9-n-dodecylcarbazole, 1-hydroxycyclohexyl phenyl ketone, bis(5-2,4-cyclopentadien-1-yl)-bis(2,6-difluoro-3-(1H-pyrrol-1-yl)-phenyl)titanium, 3,3',4,4'-tetra(t-butylperoxycarbonyl)benzophenone, 3,3',4,4'-tetra(t-hexylperoxycarbonyl)benzophenone, 3,3'-di(methoxycarbonyl)-4,4'-di(t-butylperoxycarbonyl)benzophenone, 3,4'-di(methoxycarbonyl)-4,3'-di(t-butylperoxycarbonyl)benzophenone, 4,4'-di(methoxycarbonyl)-3,3'-di(t-butylperoxycarbonyl)benzophenone, 2-(3-methyl-3H-benzothiazol-2-ylidene)-1-naphthalen-2-yl-ethanone or 2-(3-methyl-1,3-benzothiazol-2(3H)-ylidene)-1-(2-benzoyl)ethanone. These compounds may be used alone or as a mixture of two or more.

The radical polymerization method is not particularly limited, and an emulsion polymerization method, a suspension polymerization method, a dispersion polymerization method, a precipitation polymerization method, a bulk polymerization method or a solution polymerization method may, for example, be employed.

The organic solvent to be used for the polymerization reaction to obtain the photosensitive side chain type polymer is not particularly limited so long as the polymer formed is soluble in it. Its specific examples are as follows.

N,N-dimethylformamide, N,N-dimethylacetamide, N-methyl-2-pyrrolidone, N-ethyl-2-pyrrolidone, N-methylcaprolactam, dimethylsulfoxide, tetramethylurea, pyridine, dimethylsulfone, hexamethylsulfoxide, γ-butyrolactone, isopropyl alcohol, methoxymethyl pentanol, dipentene, ethyl amyl ketone, methyl nonyl ketone, methyl ethyl ketone, methyl isoamyl ketone, methyl isopropyl ketone, methyl cellosolve, ethyl cellosolve, methyl cellosolve acetate, ethyl cellosolve acetate, butyl carbitol, ethyl carbitol, ethylene glycol, ethylene glycol monoacetate, ethylene glycol monoisopropyl ether, ethylene glycol monobutyl ether, propylene glycol, propylene glycol monoacetate, propylene glycol monomethyl ether, propylene glycol-tert-butyl ether, dipropylene glycol monomethyl ether, diethylene glycol, diethylene glycol monoacetate, diethylene glycol dimethyl ether, dipropylene glycol monoacetate monomethyl ether, dipropylene glycol monomethyl ether, dipropylene glycol monoethyl ether, dipropylene glycol monoacetate monoethyl ether, dipropylene glycol monopropyl ether, dipropylene glycol monoacetate monopropyl ether, 3-methyl-3-methoxybutyl acetate, tripropylene glycol methyl ether, 3-methyl-3-methoxybutanol, diisopropyl ether, ethyl isobutyl ether, diisobutylene, amyl acetate, butyl butyrate, butyl ether, diisobutyl ketone, methylcyclohexene, propyl ether, dihexyl ether, dioxane, n-hexane, n-pentane, n-octane, diethyl ether, cyclohexanone, ethylene carbonate, propylene carbonate, methyl lactate, ethyl lactate, methyl acetate, ethyl acetate, n-butyl acetate, propylene glycol monoethyl ether acetate, methyl pyruvate, ethyl pyruvate, methyl 3-methoxypropionate, methylethyl 3-ethoxypropionate, ethyl 3-methoxypropionate, 3-ethoxypropionic acid, 3-methoxypropionic acid, propyl 3-methoxypropionate, butyl 3-methoxypropionate, diglime, 4-hydroxy-4-methyl-2-pentanone, 3-methoxy-N,N-dimethylpropanamide, 3-ethoxy-N,N-dimethylpropanamide and 3-butoxy-N,N-dimethylpropanamide may, for example, be mentioned.

Such organic solvents may be used alone or as a mixture. Further, even a solvent in which the polymer formed is not soluble may be used as mixed with the organic solvent within a range where the polymer formed does not precipitate.

Further, in radical polymerization, oxygen in the organic solvent may inhibit the polymerization reaction, and accordingly the organic solvent is preferably deaerated as far as possible.

At the time of the radical polymerization, the polymerization temperature may be an optional temperature within a range of from 30° C. to 150° C., and is preferably within a range of from 50 to 100° C. Further, although the reaction may be conducted at an optional concentration, a high molecular weight polymer will hardly be obtained if the concentration is too low, and uniform stirring tends to be difficult due to too high viscosity of the reaction liquid if the concentration is too high, and accordingly the monomer concentration is preferably from 1 to 50 mass %, more preferably from 5 to 30 mass %. The reaction may be carried out at a high concentration at the initial stage, and then an organic solvent may be added.

In the above radical polymerization reaction, the molecular weight of the obtainable polymer tends to be low when the proportion of the radical polymerization initiator is high relative to the monomer, and the molecular weight of the obtainable polymer tends to be high when the proportion is low. Accordingly, the proportion of the radical polymerization initiator is preferably from 0.1 to 10 mol % based on the monomer to be polymerized. Further, at the time of polymerization, various monomer components, the solvent, the initiator, etc., may be added.

In a case where the formed polymer is to be recovered from the reaction solution containing the photosensitive side chain type polymer obtained by the above reaction, the reaction solution may be poured into a poor solvent to precipitate the polymer. Such a poor solvent may, for example, be methanol, acetone, hexane, heptane, butyl cellosolve, heptane, methyl ethyl ketone, methyl isobutyl ketone, ethanol, toluene, benzene, diethyl ether, methyl ethyl ether or water. The polymer precipitated by pouring the reaction solution into the poor solvent may be collected by filtration and then dried under ordinary pressure or under reduced pressure at room temperature or by heating. Further, the amount of impurities in the polymer can be reduced by repeating an operation of dissolving the recovered polymer in the organic solvent again to precipitate the polymer again and recovering it, twice to ten times. The poor solvent in such an operation may, for example, be an alcohol, a ketone or a hydrocarbon, and it is preferred to use three or more types selected from among such poor solvents, whereby the purification efficiency will further improve.

The molecular weight of the photosensitive side chain type polymer contained in the second liquid crystal aligning agent is preferably from 2,000 to 1,000,000, more preferably from 5,000 to 100,000, by the weight average molecular weight measured by GPC (gel permeation chromatography) method, considering the strength of the coating film, workability at the time of forming the coating film, and uniformity of the coating film.

[Preparation of Second Liquid Crystal Aligning Agent]

The second liquid crystal aligning agent is so constituted as containing the photosensitive side chain type polymer. And, it is preferably prepared as a coating liquid which is suitable for forming the liquid crystal alignment film. That is, the second liquid crystal aligning agent used in the present invention is preferably prepared as a solution in which a resin component for forming the resin coating film is dissolved in an organic solvent. The resin component is a resin component containing the above-described photosensitive side chain type polymer. The content of the resin component is preferably from 1 to 20 mass %, more preferably from 3 to 15 mass %, particularly preferably from 3 to 10 mass %.

In the second liquid crystal aligning agent, the resin component may be entirely photo sensitive side chain type polymer, but another polymer may be mixed within a range not to impair the liquid crystal development performance and photosensitive performance. In such a case, the content of another polymer among the resin components is from 0.5 to 80 mass %, preferably from 1 to 50 mass %. Such another polymer may, for example, be a polymer which is not a photosensitive side chain type polymer, which is composed of e.g. poly(meth)acrylate, polyamic acid, polyimide or the like.

<Organic Solvent>

The organic solvent to be used for the second liquid crystal aligning agent is not particularly limited so long as the resin component is soluble in it. Specific examples thereof are as follows.

N,N-dimethylformamide, N,N-dimethylacetamide, N-methyl-2-pyrrolidone, N-methylcaprolactam, 2-pyrrolidone, N-ethylpyrrolidone, N-vinylpyrrolidone, dimethylsulfoxide, tetramethylurea, pyridine, dimethylsulfone, hexamethylsulfoxide, γ-butyrolactone, 3-methoxy-N,N-dimethylpropanamide, 3-ethoxy-N,N-dimethylpropanamide, 3-butoxy-N,N-dimethylpropanamide, 1,3-dimethyl-imidazolidinone, ethyl amyl ketone, methyl nonyl ketone, methyl ethyl ketone, methyl isoamyl ketone, methyl isopropyl ketone, cyclohexanone, ethylene carbonate, propylene carbonate, diglyme, 4-hydroxy-4-methyl-2-pentanone, propylene glycol monoacetate, propylene glycol monomethyl ether, propylene glycol-tert-butyl ether, dipropylene glycol monomethyl ether, diethylene glycol, diethylene glycol monoacetate, diethylene glycol dimethyl ether, dipropylene glycol monoacetate monomethyl ether, dipropylene glycol monomethyl ether, dipropylene glycol monoethyl ether, dipropylene glycol monoacetate monoethyl ether, dipropylene glycol monopropyl ether, dipropylene glycol monoacetate monopropyl ether, 3-methyl-3-methoxybutyl acetate and tripropylene glycol methyl ether may, for example, be mentioned. They may be used alone or as a mixture.

The second liquid crystal aligning agent may contain a component other than the above component, such as the first polymer. Examples of which include a solvent or compound which improves the film thickness uniformity and the surface smoothness, and a compound which improves the adhesion between the liquid crystal alignment film and the substrate, when the liquid crystal aligning agent is applied.

Specific examples of a solvent (poor solvent) which improves the film thickness uniformity and the surface smoothness are as follows. For example, solvents having a low surface tension, such as isopropyl alcohol, methoxymethyl pentanol, methyl cellosolve, ethyl cellosolve, butyl cellosolve, methyl cellosolve acetate, ethyl cellosolve acetate, butyl carbitol, ethyl carbitol, ethyl carbitol acetate, ethylene glycol, ethylene glycol monoacetate, ethylene glycol monoisopropyl ether, ethylene glycol monobutyl ether, propylene glycol, propylene glycol monoacetate, propylene glycol monomethyl ether, propylene glycol-tert-butyl ether, dipropylene glycol monomethyl ether, diethylene glycol, diethylene glycol monoacetate, diethylene glycol dimethyl ether, dipropylene glycol monoacetate monomethyl ether, dipropylene glycol monomethyl ether, dipropylene glycol monoethyl ether, dipropylene glycol monoacetate monoethyl ether, dipropylene glycol monopropyl ether, dipropylene glycol monoacetate monopropyl ether, 3-methyl-3-methoxybutyl acetate, tripropylene glycol methyl ether, 3-methyl-3-methoxybutanol, diisopropyl ether, ethyl isobutyl ether, diisobutylene, amyl acetate, butyl butyrate, butyl ether, diisobutyl ketone, methylcyclohexene, propyl ether, dihexyl ether, 1-hexanol, n-hexane, n-pentane, n-octane, diethyl ether, methyl lactate, ethyl lactate, methyl acetate, ethyl acetate, n-butyl acetate, propylene glycol monoethyl ether acetate, methyl pyruvate, ethyl pyruvate, methyl 3-methoxypropionate, methylethyl 3-ethoxypropionate, ethyl 3-methoxypropionate, 3-ethoxypropionic acid, 3-methoxypropionic acid, propyl 3-methoxypropionate, butyl3-methoxypropionate, 1-methoxy-2-propanol, 1-ethoxy-2-propanol, 1-butoxy-2-propanol, 1-phenoxy-2-propanol, propylene glycol monoacetate, propylene glycol diacetate, propylene glycol-1-monomethyl ether-2-acetate, propylene glycol-1-monoethyl ether-2-acetate, dipropylene glycol, 2-(2-ethoxypropoxy)propanol, lactic acid methyl ester, lactic acid ethyl ester, lactic acid n-propyl ester, lactic acid n-butyl ester and lactic acid isoamyl ester may, for example, be mentioned.

Such poor solvents may be used alone or as a mixture or two or more. In a case where the above solvent is used, in order not to remarkably decrease the solubility of the entire solvent contained in the liquid crystal aligning agent, its content is preferably from 5 to 80 mass %, more preferably from 20 to 60 mass % of the entire solvent.

The compound which improves the film thickness uniformity and the surface smoothness may, for example, be a fluorinated surfactant, a silicone surfactant or a nonionic surfactant.

More specifically, for example, Eftop 301, EF303 and EF352 (tradenames, manufactured by TOHKEM PRODUCTS CORPORATION), MEGAFAC F171, F173 and R-30 (tradenames, manufactured by DIC Corporation), Fluorad FC430 and FC431 (tradenames, manufactured by Sumitomo 3M Limited), AsahiGuard AG710 (tradename, manufactured by Asahi Glass Company, Limited) and SURFLON S-382, SC101, SC102, SC103, SC104, SC105 and SC106 (tradenames, manufactured by AGC SEIMI CHEMICAL CO., LTD.) may be mentioned.

The proportion of such a surfactant is preferably from 0.01 to 2 parts by mass, more preferably from 0.01 to 1 part by mass per 100 parts by mass of the resin component contained in the liquid crystal aligning agent.

As specific examples of the compound which improves the adhesion between the liquid crystal alignment film and the substrate, the following functional silane-containing compounds may, for example, be mentioned. For example, 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonyl acetate, 9-triethoxysilyl-3,6-diazanonyl acetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysilane, N-bis(oxyethylene)-3- aminopropyltrimethoxysilane and N-bis(oxyethylene)-3-aminopropyltriethoxysilane may, for example, be mentioned.

Further, for the purpose of preventing e.g. decrease of the electrical properties by a backlight when a liquid crystal display device is constituted, in addition to improving the adhesion between the substrate and the liquid crystal alignment film, the following phenoplast type or epoxy group-containing compound additive may be incorporated in the second liquid crystal aligning agent. Specific phenoplast type additives are shown below, however, the phenoplast type additive is not limited thereto.

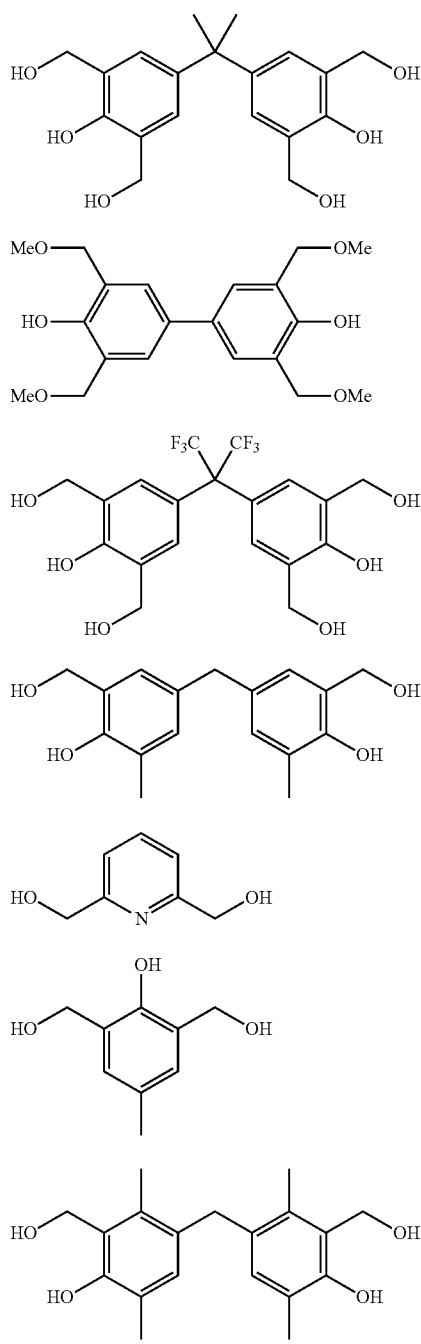

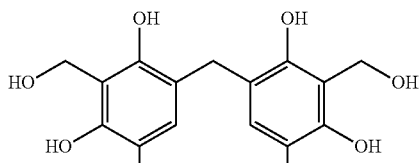

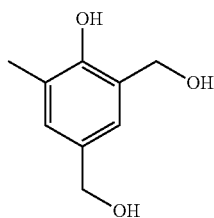

As specific epoxy group-containing compounds, ethylene glycol diglycidyl ether, polyethylene glycol diglycidyl ether, propylene glycol diglycidyl ether, tripropylene glycol diglycidyl ether, polypropylene glycol diglycidyl ether, neopentyl glycol diglycidyl ether, 1,6-hexanediol diglycidyl ether, glycerin diglycidyl ether, 2,2-dibromoneopentyl glycol diglycidyl ether, 1,3,5,6-tetraglycidyl-2,4-hexanediol, N,N,N',N',-tetraglycidyl-m-xylenediamine, 1,3-bis(N,N-diglycidylaminomethyl)cyclohexane and N,N,N',N',-tetraglycidyl-4,4'-diaminodiphenylmethane may, for example, be mentioned.

In a case where the compound which improves the adhesion to the substrate is used, its amount of use is preferably from 0.1 to 30 parts by mass, more preferably from 1 to 20 parts by mass per 100 parts by mass of the resin component contained in the liquid crystal aligning agent. If the amount of use is less than 0.1 part by mass, no effect to improve the adhesion can be expected, and if it is larger than 30 parts by mass, the liquid crystal alignment property may sometimes be deteriorated.

As the additive, a photosensitizer may also be used. A colorless photosensitizer or a triplet photosensitizer is preferred. The photosensitizer, may, for example, be an aromatic nitro compound, coumarin (7-diethylamino-4-methylcoumarin or 7-hydroxy 4-methylcoumarin), ketocoumarin, carbonylbiscoumarin, aromatic 2-hydroxyketone or amino-substituted aromatic 2-hydroxyketone (2-hydroxybenzophenone or mono- or di-p-(dimethylamino)-2-hydroxybenzophenone), acetophenone, anthraquinone, xanthone, thioxanthone, benzanthrone, thiazoline (2-benzoylmethylene-3-methyl-β-naphthothiazoline, 2-(β-naphthoylmethylene)-3-methylbenzothiazoline, 2-(α-naphthoylmethylene)-3-methylbenzothiazoline, 2-(4-biphenoylmethylene)-3-methylbenzothiazoline, 2-(β-naphthoylmethylene)-3-methyl-β-naphthothiazoline, 2-(4-biphenoylmethylene)-3-methyl-β-naphthothiazoline or 2-(p-fluorobenzoylmethylene)-3-methyl-β-naphthothiazoline), oxazoline (2-benzoylmethylene-3-methyl-β-naphthoxazoline, 2-(β-naphthoylmethylene)-3-methylbenzoxazoline, 2-(α-naphthoylmethylene)-3-methylbenzoxazoline, 2-(4-biphenoylmethylene)-3-methylbenzoxazoline, 2-(β-naphthoylmethylene)-3-methyl-β-naphthoxazoline, 2-(4-biphenoylmethylene)-3-methyl-β-naphthoxazoline or 2-(p-fluorobenzoylmethylene)-3-methyl-β-naphthoxazoline), benzothiazole, nitroaniline (m- or p-nitroaniline or 2,4,6-trinitroaniline) or nitroacenaphthene (5-nitroacenaphthene), (2-[(m-hydroxy-p-methoxy)styryl]benzothiazole, benzoin alkyl ether, N-alkylated phthalone, acetophenone ketal (2,2-dimethoxyphenylethanone), naphthalene, anthracene (2-naphthalenemethanol, 2-naphthalenecarboxylic acid, 9-anthracenemethanol and 9-anthracenecarboxylic acid), benzopyran, azoindolizine or merocoumarin.

Preferred is aromatic 2-hydroxyketone (benzophenone), coumarin, ketocoumarin, carbonylbiscoumarin, acetophenone, anthraquinone, xanthone, thioxanthone or acetophenone ketal.

To the second liquid crystal aligning agent, within a range not to impair the effects of the present invention, a derivative or a conductive substance may be added for the purpose of changing electrical properties such as the dielectric constant or the electrical conductivity of the obtainable liquid crystal alignment film, or a crosslinkable compound may be added for the purpose of increasing the hardness and denseness of a liquid crystal alignment film obtained. Further, various additives disclosed in the description for the first liquid crystal aligning agent may be added.

<Method for Producing Second Alignment Film>

As the method for producing the second alignment film, on a second substrate, as described below, the above second liquid crystal aligning agent is applied to form a coating film, which is irradiated with polarized ultraviolet rays to impart alignment control performance.

Specific procedure will be described below.

On a second substrate, the second liquid crystal aligning agent is applied to form a coating film.

The method of applying the second liquid crystal aligning agent to the second substrate is not particularly limited, and industrially, it is preferably carried out by screen printing, offset printing, flexographic printing or an ink jet method. As another application method, a dipping method, a roll coater method, a slit coater method, a spinner method or a spraying method may, for example, be mentioned and employed depending upon the purpose.

After the second liquid crystal aligning agent is applied to the substrate, the solvent is evaporated by a heating means such as a hot plate, a circulating hot air oven or an IR (infrared) oven at from 20 to 180° C., preferably from 40 to 150° C., to obtain a coating film. The thickness of the coating film is preferably from 5 to 300 nm, more preferably from 10 to 150 nm, since if it is too thick, such is disadvantageous in view of electric power consumption of the device, and if it is too thin, the reliability of the device may sometimes be decreased.

The second substrate on which the coating film is formed may be cooled to room temperature as the case requires.

The obtained coating film is irradiated with polarized ultraviolet rays. In a case where the film surface of the coating film is irradiated with polarized ultraviolet rays, the coating film is irradiated with polarized ultraviolet rays via a polarizing plate from a certain direction to the substrate. As ultraviolet rays, ultraviolet rays having a wavelength of from 100 to 400 nm may be used, and the optimum wavelength is selected via e.g. a filter depending upon the type of the coating film used. For example, ultraviolet rays having a wavelength within a range of from 290 to 400 nm may be selected so as to selectively induce photocrosslinking. As ultraviolet rays, for example, light emitted from a high pressure mercury lamp may also be used.

The amount of irradiation with polarized ultraviolet rays is preferably within a range of from 1 to 70%, more preferably within a range of from 1 to 50%, of the amount of polarized ultraviolet rays which realizes a maximum value of ΔA (hereinafter sometimes referred to as ΔAmax) which is a difference between the absorbance of ultraviolet rays in a direction in parallel with the polarization direction of the polarized ultraviolet rays and the absorbance of ultraviolet rays in a direction perpendicular to the polarization direction of the polarized ultraviolet rays in the coating film used.

The coating film irradiated with the polarized ultraviolet rays is then preferably subjected to a heat treatment to develop liquid crystallinity. For heating, a means such as a hot plate, a circulating hot air oven or an IR (infrared) oven may be employed. The heating temperature may be determined considering the temperature at which the liquid crystallinity of the coating film is developed. For example, the heating temperature is preferably a temperature within a range of from a temperature lower by 10° C. than the lower limit of the liquid crystal temperature range within which the coating film to be used develops liquid crystallinity, as the lower limit, to the temperature lower by 10° C. than the upper limit of the liquid crystal temperature range, as the upper limit, preferably from 100 to 250° C., more preferably from 100 to 200° C., particularly preferably from 100 to 150° C.

The second alignment film may be subjected to a contact treatment with water or a hydrophilic organic solvent, before or after irradiation with the polarized ultraviolet rays, in the same manner as in the case of the first alignment film. To conduct such a contact treatment, the same conditions as in the contact treatment for the first alignment film may be employed.

<Liquid Crystal Display Device>

Using the first substrate and the second substrate, each having the alignment film, obtained as mentioned above, one substrate is overlaid on the other substrate so that the respective alignment films face each other, and the periphery is bonded by a sealing material. Usually, spacers may be mixed with the sealing agent so as to control the gap between the substrates. Further, it is preferred to spread spacers for controlling the gap between the substrates also on an inner portion where the sealing material is not provided. An opening through which the liquid crystal is injected from the outside is preferably provided on a part of the sealing material.

Then, through the opening provided on the sealing material, a liquid crystal material is injected into a space surrounded by the two substrates and the sealing material. Then, the opening is sealed with an adhesive. For injection, a vacuum injection method may be employed, or a method utilizing capillarity in the atmosphere may be employed. Then, polarizing plates are placed. Specifically, a pair of polarizing plates are bonded to each of the two substrates on a side opposite from the liquid crystal layer. By the above procedure, the liquid crystal display device is obtained.

As the sealing agent, a resin to be cured by irradiation with ultraviolet rays or by heating, having a reactive group such as an epoxy group, an acryloyl group, a (meth)acryloyl group, a hydroxy group, an allyl group or an acetyl group, is used. Particularly, it is preferred to use a curable resin having both reactive groups of an epoxy group and a (meth)acryloyl group.

The sealing agent may contain an inorganic filler for the purpose of improving the bonding property and the moisture resistance. The inorganic filler to be used is not particularly limited. It may, for example, be spherical silica, molten silica, crystalline silica, titanium oxide, titanium black, silicon carbide, silicon nitride, boron nitride, calcium carbonate, magnesium carbonate, barium sulfate, calcium sulfate, mica, talc, clay, alumina, magnesium oxide, zirconium oxide, aluminum hydroxide, calcium silicate, aluminum silicate, lithium aluminum silicate, zirconium silicate, barium titanate, glass fibers, carbon fibers, molybdenum disulfide or asbestos. It is preferably spherical silica, molten silica, crystalline silica, titanium oxide, titanium black, silicon nitride, boron nitride, calcium carbonate, barium sulfate, calcium sulfate, mica, talc, clay, alumina, aluminum hydroxide, calcium silicate or aluminum silicate. Such inorganic fillers may be used as a mixture of two or more.

EXAMPLES

Now, the present invention will be described in further detail with reference to Examples. However, it should be understood that the present invention is by no means restricted to such specific Examples. Abbreviations of compounds are as follows.

<Organic Solvent>
NMP: N-methyl-2-pyrrolidone
GBL: γ-butyrolactone
BCS: butyl cellosolve
THF: tetrahydrofuran <Diamine Compound>

In the following chemical formulae, Me represents a methyl group, Bu a n-butyl group and Boc a t-butoxy group.

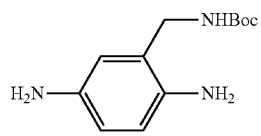
DA-1

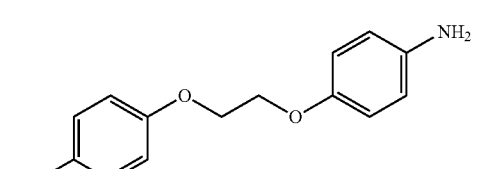
DA-2

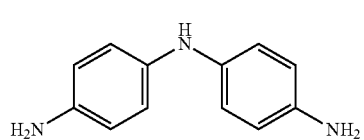
DA-3

DA-4: 3,5-diaminobenzoic acid

<Tetracarboxylic Dianhydride>
DC-1: 1,3-dimethyl-1,2,3,4-cyclobutanetetracarboxylic dianhydride
DC-2: 3,3',4,4'-biphenyltetracarboxylic dianhydride
DC-3: 1,2,3,4-butanetetracarboxylic dianhydride <Methacryl Monomer>

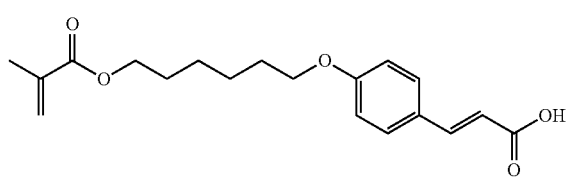
MA1

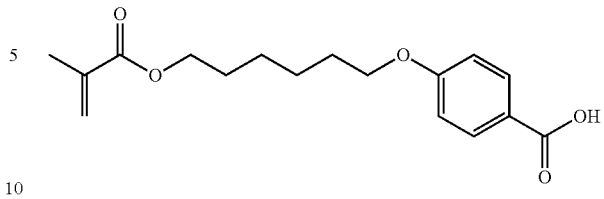
MA2

MA1 was prepared in accordance with the method disclosed in WO2011/084546.
MA2 was prepared in accordance with the method disclosed in JP-A-9-118717.

<Polymerization Initiator>
AIBN: 2,2'-azobisisobutyronitrile

The respective properties were measured as follows.

[Viscosity]

The viscosity was measured using an E type viscometer TVE-22H (manufactured by Toki Sangyo Co., Ltd.) with a sample amount of 1.1 mL (milliliter) with cone roter TE-1 (1°34', R24) at a temperature of 25° C.

[Molecular Weight]

With respect to the molecular weight, the number average molecular weight (hereinafter sometimes referred to as Mn) and the weight average molecular weight (hereinafter sometimes referred to as Mw) as values as calculated as polyethylene glycol (polyethylene oxide), were calculated by measurement by a GPC (room temperature gel permeation chromatography) apparatus.

GPC apparatus: Shodex (GPC-101)
Column: Shodex (KD803 and KD805 in series)
Column temperature: 50° C.
Eluent: N,N-Dimethylformamide (as additives, 30 mmol/L of lithium bromide monohydrate (LiBrH$_2$O), 30 mmol/L of phosphoric acid anhydrous crystals (o-phosphoric acid) and 10 ml/L of tetrahydrofuran (THF))
Flow rate: 1.0 ml/min
Standard sample for preparation of calibration curve: TSK standard polyethylene oxide (weight average molecular weight (Mw): about 900,000, 150,000, 100,000 and 30,000) manufactured by TOSOH CORPORATION, and polyethylene glycol (peak top molecular weight (Mp): about 12,000, 4,000 and 1,000) manufactured by Polymer Laboratories Ltd. In order to prevent peaks from overlapping with one another, two kinds of samples i.e. a sample having four types of polymers with molecular weights of 900,000, 100,000, 12,000 and 1,000 mixed and a sample having three types of polymers with molecular weights of 150,000, 30,000 and 4,000 mixed, were separately subjected to measurement.

[Measurement of Imidization Degree]

The imidization degree of the polyimide was measured as follows. 20 mg of a polyimide powder was put in a NMR sample tube (NMR sampling tube standard, diameter: 5 (manufactured by KUSANO SCIENCE CORPORATION), deuterated dimethyl sulfoxide (DMSO-d6, 0.05 mass % TMS (tetramethylsilane) mixed) (0.53 mL) was added, and ultrasonic waves were applied to completely dissolve the polyimide powder. The solution was subjected to 500 MHz proton NMR measurement by a NMR measuring apparatus (JNW-ECA500) (manufactured by JEOL Ltd. DATUM Solution Business Operations).

The imidization degree was determined in accordance with the following formula from the peak integrated value of proton derived from a structure which did not change between before and after the imidization as standard proton, and the peak integrated value of proton derived from the NH group of the amide acid which appeared in the vicinity of from 9.5 to 10.0 ppm.

Imidization degree (%)=(1−α·x/y)×100

In the above formula, x is the peak integrated value of proton derived from the NH group of the amide acid, y is the peak integrated value of standard proton, and a is the proportion of the number of standard proton per one proton derived from the NH group of the amide acid in the case of a polyamide acid (imidization degree: 0%).

Preparation Example 1

In a 2,000 mL four-necked flask equipped with a stirring apparatus and a nitrogen induction tube, 110.47 g (452 mmol) of diamine DA-2 and 18.94 g (79.5 mmol) of DA-1 were weighed, and 1,587 g of NMP was added, followed by stirring while nitrogen was supplied, to dissolve DA-2 and DA-1. 111.18 g (496 mmol) of carboxylic dianhydride DC-1 was added to the resulting diamine solution with stirring, and NMP was further added so that the solid content concentration would be 12 mass %, followed by stirring at 40° C. for 20 hours to obtain a polyamic acid (PAA-1) solution. Of the polyamic acid, Mn was 12,356, Mw was 25,544, and the viscosity was 183 mPa·s.

Preparation Example 2

In a 3,000 mL four-necked flask equipped with a stirring apparatus and a nitrogen induction tube, 950 g of the obtained polyamic acid solution (PAA-1) was weighed, and 678 g of NMP was added, followed by stirring for 30 minutes. To the obtained polyamic acid solution, 77.11 g of acetic anhydride and 19.92 g of pyridine were added, followed by heating at 60° C. for 3 hours to conduct chemical imidization. The obtained reaction liquid was poured into 6,600 mL of methanol with stirring, and the obtained precipitate was collected by filtration and washed with 6,600 mL of methanol three times and with 2,000 mL of methanol twice. Then, the obtained resin powder was dried at 60° C. for 12 hours to obtain a polyimide resin powder.

Of the polyimide resin powder, the imidization degree was 71%, Mn was 8,156, and Mw was 17,408.

20.69 g of the obtained polyimide resin powder was weighed in a 200 mL Erlenmeyer flask in which a stirrer was put, and 151.71 g of NMP was added, followed by stirring at 40° C. for 24 hours to dissolve the polyimide resin powder to obtain a polyimide solution (PI-1) having a solid content concentration of 12 mass %.

Preparation Example 3

In a 2,000 mL four-necked flask equipped with a stirring apparatus and a nitrogen induction tube, 54.20 g (272 mmol) of DA-3 and 10.35 g (68 mmol) of DA-4 were weighed, and 387 g of NMP was added, followed by stirring while nitrogen was supplied, to dissolve DA-3 and DA-4. 20.21 g (102 mmol) of DC-3 was added to the resulting diamine solution with stirring, and 111 g of NMP was added, followed by reaction at room temperature for 5 hours. Then, 66.0 g (224 mmol) of DC-2 was added, and NMP was added so that the solid content concentration would be 12 mass %, followed by stirring at room temperature for 24 hours to obtain a polyamic acid (PAA-2) solution. The viscosity of the polyamic acid solution was 390 mPa—s.

The amounts of use of the respective components and the polyimide polymer in Preparation Examples 1 to 3 are shown in Table 1.

TABLE 1

|  | Polyimide polymer | Diamine component | | Carboxylic acid component | |
|---|---|---|---|---|---|
|  |  | Diamine compound | Diamine compound | Carboxylic dianhydride | Carboxylic dianhydride |
| Preparation Example 1 | PAA-1 | DA-1 18.94 g (79.5 mmol) | DA-2 110.47 g (452 mmol) | DC-1 111.18 g (496 mmol) | — |
| Preparation Example 2 | PI-1 | DA-1 18.94 g (79.5 mmol) | DA-2 110.47 g (452 mmol) | DC-1 111.18 g (496 mmol) | — |
| Preparation Example 3 | PAA-2 | DA-3 54.20 g (272 mmol) | DA-4 10.35 g (68 mmol) | DC-2 60.0 g (224 mmol) | DC-3 20.21 g (102 mmol) |

Preparation Example 4

MA1 (1.99 g, 6.0 mmol) and MA2 (2.75 g, 9.0 mmol) were dissolved in THF (44.57 g), followed by followed by dearation by a diaphragm pump, and AIBN (0.12 g, 0.5 mmol) was added, followed by deaeration again. Then, reaction was conducted at 50° C. for 30 hours to obtain a polymer solution of methacrylate. The resulting polymer solution was dropwise added to diethyl ether (500 ml), and the obtained precipitate was collected by filtration. The precipitate was washed with diethyl ether and vacuum dried in an oven at 40° C. to obtain a methacrylate polymer powder.

To 6.0 g of the obtained methacrylate polymer powder, NMP (29.3 g) was added, followed by stirring at room temperature for 5 hours to dissolve the methacrylate polymer powder. To the resulting solution, NMP (24.7 g) and BC (40.0 g) were added, followed by stirring, to obtain a methacrylate polymer solution (M1). When stirring was completed, the polymer was completely dissolved.

TABLE 2

|  | Methacrylate polymer | Monomer A | Monomer B | Initiator |
|---|---|---|---|---|
| Preparation Example 4 | M1 | MA1 1.99 g | MA2 2.75 g | AIBN 0.12 g |

[Preparation of Liquid Crystal Aligning Agent]

Example 1

Into a 20 ml sample tube in which a stirrer was put, 4.58 g of the polyimide solution (PI-1) obtained in Preparation Example 2 and 4.58 g of the polyamic acid solution (PAA-2) obtained in Preparation Example 3 were weighed, and 6.83 g of NMP, 4.00 g of BCS and 0.15 g of N-α-(9-fluorenylmethoxycarbonyl)-N-τ-t-butoxycarbonyl-L-histidine as an imidization accelerator were added, followed by stirring at room temperature for 3 hours to obtain a liquid crystal aligning agent A1.

Using the above liquid crystal aligning agent A1 and the above methacrylate polymer solution (M1), a liquid crystal cell was prepared and evaluated in acordance with the following procedure.

[Preparation of FFS Mode Liquid Crystal Cell, and Evaluation of Liquid Crystal Alignment Property]

First, an electrode-provided substrate was prepared. The substrate is a glass substrate of 30 mm×35 mm×0.7 mm in thickness. On the substrate, an IZO electrode with a solid pattern constituting a counter electrode is formed as a first layer. On the counter electrode as the first layer, a SiN (silicon nitride) film formed by a CVD method is formed as a second layer. The SiN film as the second layer has a thickness of 500 nm and functions as an interlayer dielectric film. On the SiN film as the second layer, a pectinate pixel electrode formed by patterning an IZO film is arranged as a third layer, to form two pixels i.e. a first pixel and a second pixel. The size of each pixel is 10 mm × about 5 mm. The counter electrode as the first layer and the pixel electrode as the third layer are electrically insulated by the action of the SiN film as the second layer.

The pixel electrode as the third layer has a pectinate form composed of a plurality of dogleg electrode elements bending at their center portion. The width of each electrode element in a shorter direction is 3 µm, and the interval between the electrode elements is 6 µm. Since a pixel electrode forming each pixel is composed of a plurality of dogleg electrode elements bending at their center portion arranged, the shape of each pixel is not rectangular but is a bold dogleg-like shape bending at its center portion like the electrode elements. And, each pixel is horizontally divided at the bending portion at its center into two halves i.e. a first region above the bending portion and a second region below the bending portion.

By comparison between the first region and the second region of each pixel, the directions of formation of electrode elements constituting the respective regions of the pixel electrode are different. That is, based on the after-described liquid crystal alignment direction of the liquid crystal alignment film, the electrode elements of the pixel electrode are formed to form an angle of +10° in the first region of the pixel, and the electrode elements of the pixel electrode are formed to form an angle of −10° in the second region of the pixel. That is, the first region and the second region of each pixel are constituted so that the directions of in-plane switching of liquid crystals induced by application of a voltage between the pixel electrode and the counter electrode are opposite from each other.

Then, the liquid crystal aligning agent A1 was subjected to filtration through a filter with a pore size of 1.0 µm, and applied to the above electrode-provided substrate by spin coating and dried on a hot plate at 80° C. for 2 minutes, followed by baking by a circulating hot air oven at 230° C. for 14 minutes to form a coating film having a thickness of 100 nm. The coating film surface was irradiated with 200 mJ/cm$^2$ of ultraviolet rays having a wavelength of 254 nm via a polarizing plate, dipped in ethyl lactate for 5 minutes and then dipped in pure water for 1 minute, followed by baking by a circulating hot air oven at 230° C. for 14 minutes to obtain a substrate provided with a liquid crystal alignment film (first substrate).

Further, to a glass substrate having a columnar spacer with a height of 4 µm and having no electrode formed thereon, as a counter substrate, a methacrylate polymer solution (M1) was applied in the same manner, and dried on a hot plate at 70° C. for 90 seconds to form a liquid crystal alignment film having a film thickness of 100 nm. The coating film surface was irradiated with 5 mJ/cm$^2$ of ultraviolet rays having a wavelength of 313 nm via a polarizing plate, followed by heating by a hot plate at 150° C. for 10 minutes to obtain a substrate provided with a liquid crystal alignment film (second substrate).

Using these two substrates as a pair, a sealing agent (XN-1500T, manufactured by Kyoritsu Chemical Co., Ltd.) was printed on one substrate, and the other substrate was bonded so that the liquid crystal alignment film surfaces faced each other and the alignment directions would be 0°, and the sealing agent was cured to prepare an empty cell. To the empty cell, liquid crystal MLC-2041 (manufactured by Merck) was vacuum-injected, and the injection inlet was sealed to obtain a FFS mode liquid crystal cell.

The alignment state of the liquid crystal cell was observed by a polarizing microscope (manufactured by Nikon Corporation, ECLIPSE E600WPOL), and a liquid crystal cell without alignment failure was rated as "good", and a liquid crystal cell with alignment failure was rated as "poor".

[Evaluation of Alternating-Current Drive Baking Of Liquid Crystal Cell]

To the above-prepared liquid crystal cell, an alternating-current voltage of ±10 V was applied at a frequency of 30 Hz for 120 hours in a constant temperature environment at 60° C. Then, the pixel electrode and the counter electrode of the liquid crystal cell were short-circuited, and the liquid crystal cell was left to stand as it was at room temperature one day.

After the liquid crystal cell was left to stand, it was placed between two polarizing plates disposed so that the polarizing axes were at right angles to each other, and while the backlight was turned on in a state where no voltage was applied, and the angle of disposition of the liquid crystal cell was adjusted so that the brightness of the transmitted light was the smallest. And, the rotation angle when the liquid crystal cell was rotated from an angle at which the second region of the first pixel was darkest to an angle at which the first region was darkest, was calculated as an angle Δ. In the second pixel similarly, the second region and the first region were compared, and the angle Δ was calculated similarly. And, the average value of the angles Δ of the first pixel and the second pixel was calculated as the angle Δ of the liquid crystal cell, and a liquid crystal cell with an alternating-current drive baking Δ of less than 0.15 was rated as "good", and a liquid crystal cell with Δ of 0.15 or more was rated as "poor".

[Evaluation of Voltage Holding Ratio (VHR)]

To evaluate VHR, a voltage of 1 V was applied to the obtained liquid crystal cell at a temperature of 60° C. for 60 ps, and the voltage after 1,000 ms was measured, and a degree how the voltage could be held was calculate as the voltage holding ratio. Further, the liquid crystal cell after the measurement was left at rest in an environment irradiated with backlight for 120 hours, and then VHR (after aging)

was measured. Evaluation was made based on standards of good: a VHR value of at least 95%, and poor: a VHR value of less than 95%.

To measure the voltage holding ratio, a voltage holding ratio measuring apparatus VHR-1 (manufactured by TOYO Corporation) was used.

Comparative Example 1

A liquid crystal cell was prepared in the same manner as in Example 1 except that the methacryl polymer solution (M1) was used for the electrode-provided substrate (first substrate) side, and the liquid crystal aligning agent A1 was used for the side of the glass substrate having a columnar spacer with a height of 4 μm, and various properties were evaluated.

Comparative Example 2

A liquid crystal cell was prepared in the same manner as in Example 1 except that the liquid crystal aligning agent A1 was used for either of the electrode-provided substrate (first substrate) side and the counter substrate (second substrate) side, and various properties were evaluated.

Comparative Example 3

A liquid crystal cell was prepared in the same manner as in Example 1 except that the methacrylate polymer solution (M1) was used for either of the electrode-provided substrate (first substrate) side and the counter substrate (second substrate) side, and various properties were evaluated.

In Table 3, the preparation conditions for the FFS mode liquid crystal cells in Example 1 and Comparative Examples 1 to 3 were summarized. In Table 3, "-" means untreated. In Table 4, various evaluation results, etc. in Example 1 and Comparative Examples 1 to 3 were summarized.

TABLE 3

| | Electrode-provided substrate side | | | | Counter substrate side | | | |
|---|---|---|---|---|---|---|---|---|
| | Aligning agent | Baking process | Amount of irradiation with ultraviolet rays | Solvent treatment | Aligning agent | Baking process | Amount of irradiation with ultraviolet rays | Solvent treatment |
| Ex. 1 | A1 | 80° C., 2 minutes/ 230° C., 14 minutes/ 230° C., 14 minutes | 200 mJ @254 nm | Conducted | M1 | 70° C., 90 seconds/ 150° C., 10 minutes | 5.0 mJ @313 nm | — |
| Comp. Ex. 1 | M1 | 70° C., 90 seconds/ 150° C., 10 minutes | 5.0 mJ @313 nm | — | A1 | 80° C., 2 minutes/ 230° C., 14 minutes/ 230° C., 14 minutes | 200 mJ @254 nm | Conducted |
| Comp. Ex. 2 | A1 | 80° C., 2 minutes/ 230° C., 14 minutes/ 230° C., 14 minutes | 200 mJ @254 nm | Conducted | A1 | 80° C., 2 minutes/ 230° C., 14 minutes/ 230° C., 14 minutes | 200 mJ @254 nm | Conducted |
| Comp. Ex. 3 | M1 | 70° C., 90 seconds/ 150° C., 10 minutes | 5.0 mJ @313 nm | — | M1 | 70° C., 90 seconds/ 150° C., 10 minutes | 5.0 mJ @313 nm | — |

TABLE 4

| | Liquid crystal aligning agent | | Liquid crystal | Alternating-current | VHR | |
|---|---|---|---|---|---|---|
| | Electrode substrate | Counter substrate | alignment property | drive baking | Initial | After aging |
| Ex. 1 | A1 | M1 | Good | Good | Good | Good |
| Comp. Ex. 1 | M1 | A1 | Good | Good | Good | Poor |
| Comp. Ex. 2 | A1 | A1 | Good | Poor | Good | Good |
| Comp. Ex. 3 | M1 | M1 | Good | Good | Good | Poor |

INDUSTRIAL APPLICABILITY

The liquid crystal display device of the present invention is useful in a wide range of fields as a lightweight, thin and low power consumption FFS mode display device.

The entire disclosure of Japanese Patent Application No. 2015-193907 filed on Sep. 30, 2015 including specification, claims, drawings and summary is incorporated herein by reference in its entirety.

The invention claimed is:

1. A liquid crystal display device, which comprises a first substrate and a second substrate disposed to face each other with a liquid crystal sandwiched therebetween, wherein:
   the first substrate is an electrode-provided substrate having a first electrode and a plurality of second electrodes overlaid on the first electrode via an insulating film, formed on a pixel region on a surface on the liquid crystal side, such that one of the first electrode and the second electrodes is a pixel electrode and the other is a counter electrode, having a first liquid crystal alignment film firmed on the surface on the liquid crystal side of the first substrate covered with the second electrodes, and the first liquid crystal alignment film is a film comprising a polyimide having liquid crystal alignment performance imparted by irradiation with polarized ultraviolet rays; and
   the second substrate is a substrate having a second liquid crystal alignment film formed on a surface on the liquid crystal side, and the second liquid crystal alignment film is a film comprising a photosensitive side chain type polymer which develops liquid crystallinity dependent on temperature, wherein polymer units of a main chain structure of the second alignment film are polymer units of a polymer of poly(meth)acrylate or polysiloxane,
   wherein the first liquid crystal alignment film comprises a polyimide having structural units represented by formula (1):

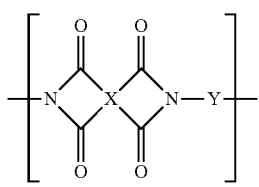
(1)

wherein X is at least one structure selected from the group consisting of structures of formulae (X1-1) to (X1-9), and Y is a bivalent organic group having an aromatic group:

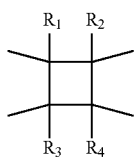
(X1-1)

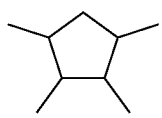
(X1-2)

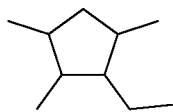
(X1-3)

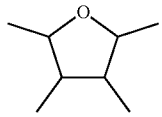
(X1-4)

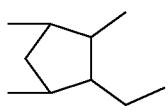
(X1-5)

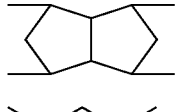
(X1-6)

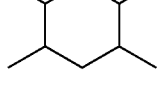
(X1-7)

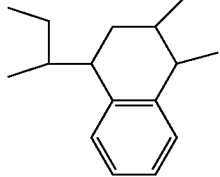
(X1-8)

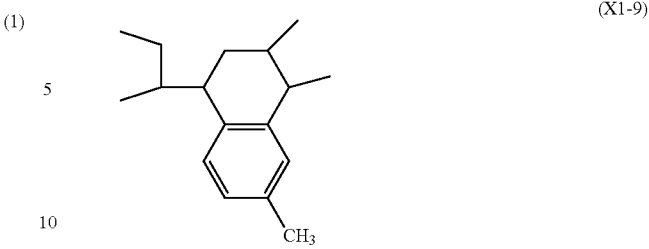
(X1-9)

wherein in the formula (X1-1), $R_1$, $R_2$, $R_3$ and $R_4$ are each independently a hydrogen atom, a halogen atom, a $C_{1-6}$ alkyl group, a $C_{2-6}$ alkenyl group, a $C_{2-6}$ a alkynyl group or a phenyl group, wherein the second liquid crystal alignment film comprises a photosensitive side chain type polymer which develops liquid crystallinity within a temperature range of from 100 to 200° C., wherein the photosensitive side chain type polymer has at least one structure represented by formulae (Z-1) to (Z-4):

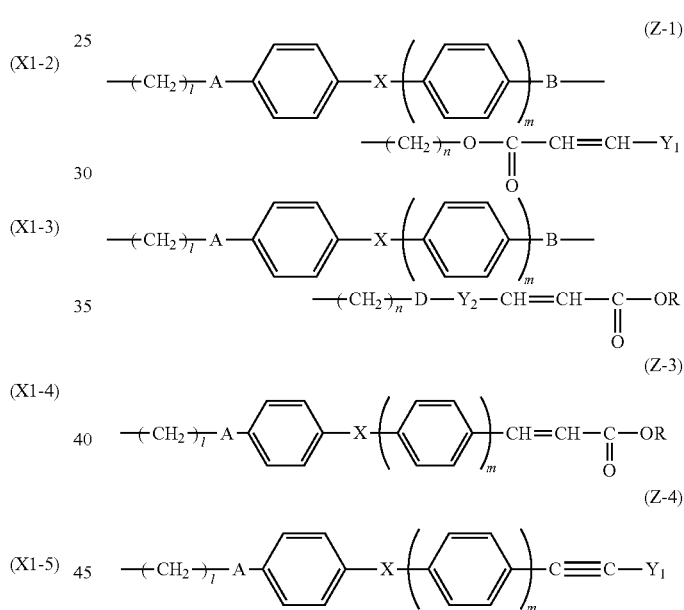

wherein
A, B and D are each independently a single bond, —O—, —CHD$_2$-, —COO—, —OCO—, —CONH— or —NH—CO—,
$Y_1$ is a monovalent benzene ring, naphthalene ring, biphenyl ring, furan ring, pyrrole ring or $C_{5-8}$ cyclic hydrocarbon, the hydrogen atom of which may be substituted by —NO$_2$, —CN, —C=(CN)$_2$, —C=CH—CN, a halogen atom, an alkyl group or an alkyloxy group,
X is a single bond, —COO—, —OCO—, —N=N—, —C=C— or —C≡C—,
l is an integer of from 1 to 12,
m is an integer of from 0 to 2,
n is an integer of from 1 to 12,
$Y_2$ is a bivalent benzene ring, naphthalene ring, biphenyl ring, furan ring, pyrrole ring or $C_{5-8}$ cyclic hydrocarbon, the hydrogen atom of which maybe substituted by —NO$_2$, —CN, —C=(CN)$_2$, —C=CH—CN, a halogen atom, an alkyl group or an alkyloxy group, and
R is a hydrogen atom or a $C_{1-6}$ alkyl group.

2. The liquid crystal display device according to claim 1 wherein X in the formula (1) has a structure of formula (X1-10) or (X1-11):

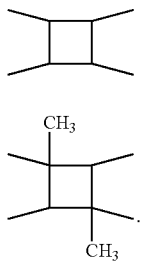

(X1-10)

(X1-11)

3. The liquid crystal display device according to claim 1, wherein Y in the formula (1) has a structure represented by any one of formulae:

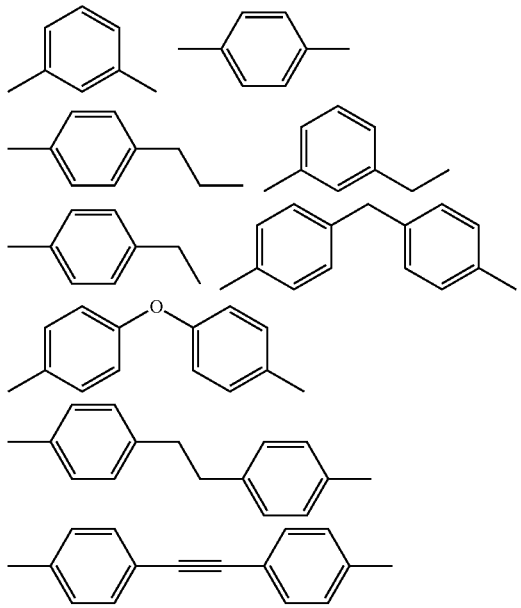

-continued

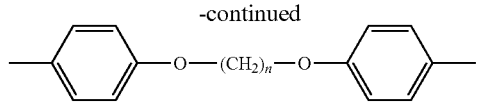

n = 1~6

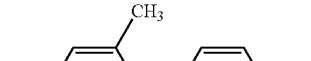

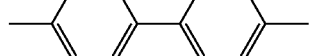

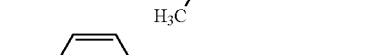

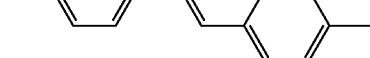

n = 2~6

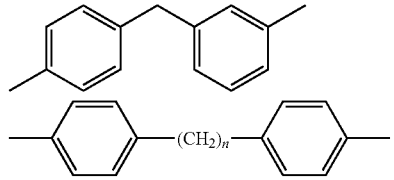

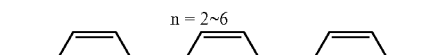

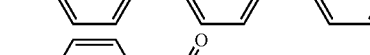

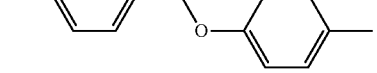

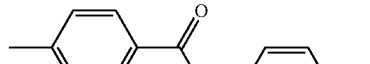

4. The liquid crystal display device according to claim 1, wherein the first liquid crystal alignment film is obtained by irradiating a polyimide film with polarized radioactive rays having a wavelength of from 10 to 800 nm at from 50 to 250° C.

5. The liquid crystal display device according to claim 1, wherein the photosensitive side chain type polymer has at least one structure selected from the group consisting of structures of formulae (Z-9) to (Z-17):

(Z-9)

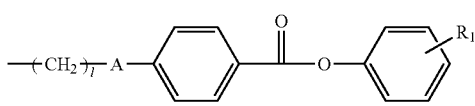

(Z-10)

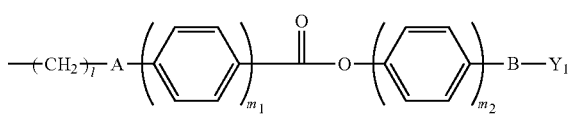

(Z-11)

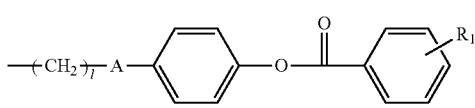

(Z-12)

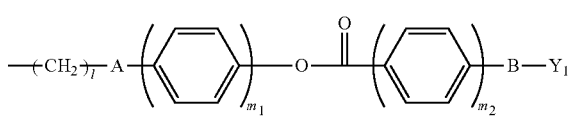

(Z-13)

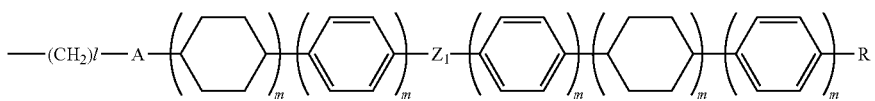

-continued

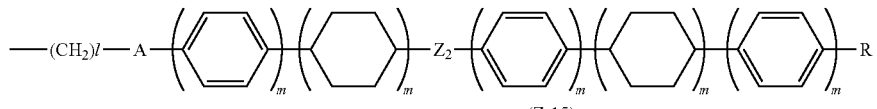

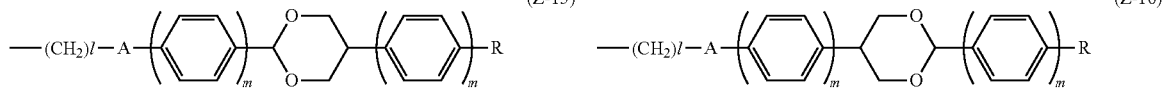

wherein

A and B are each independently a single bond, —O—, —CH$_2$—, —COO—, —CONH— or —NH—CO—, Y$_1$ is a monovalent benzene ring, naphthalene ring, biphenyl ring, furan ring, pyrrole ring or C$_{5-8}$ cyclic hydrocarbon, the hydrogen atom of which may be substituted by —NO$_2$, —CN, —C=(CN)$_2$, —C=CH—CN, a halogen atom, an alkyl group or an alkyloxy group, R is a hydrogen atom, —NO$_2$, —CN, —C=C(CN)$_2$, —C=CH—CN, a halogen atom, a C$_{1-12}$ alkyl group or a C$_{1-12}$ alkoxy group, l is an integer of from 1 to 12, m, m1 and m2 are an integer of from 1 to 3, R$_1$ is a hydrogen atom, —NO$_2$, —CN, a —C=C(CN)$_2$, —C=CH—CN, a halogen atom, an alkyl group or an alkyloxy group, and Z$_1$ and Z$_2$ are —CO—, —CH$_2$O—, —C=N— —CF$_2$—.

6. The liquid crystal display device according to claim 1, wherein the first liquid crystal alignment film and/or the second liquid crystal alignment film is obtained by a contact treatment with water or a hydrophilic organic solvent at from 10 to 80° C.

* * * * *